(12) United States Patent
Sagarsee

(10) Patent No.: US 11,548,566 B2
(45) Date of Patent: Jan. 10, 2023

(54) CARGO VEHICLE AUTOMATION AND CONSTRUCTION FEATURES

(71) Applicant: The Shyft Group, Inc., Charlotte, MI (US)

(72) Inventor: Douglas Lee Sagarsee, Elkhart, IN (US)

(73) Assignee: The Shyft Group, Inc., Charlotte, MI (US)

( * ) Notice: Subject to any disclaimer, the term of this patent is extended or adjusted under 35 U.S.C. 154(b) by 25 days.

(21) Appl. No.: 17/082,231

(22) Filed: Oct. 28, 2020

(65) Prior Publication Data

US 2021/0129917 A1 May 6, 2021

Related U.S. Application Data

(60) Provisional application No. 63/105,946, filed on Oct. 27, 2020, provisional application No. 62/929,293, filed on Nov. 1, 2019.

(51) Int. Cl.
| | | |
|---|---|---|
| *B62D 25/20* | (2006.01) | |
| *B62D 33/02* | (2006.01) | |
| *B60P 1/00* | (2006.01) | |

(52) U.S. Cl.
CPC .......... *B62D 25/2054* (2013.01); *B60P 1/003* (2013.01)

(58) Field of Classification Search
CPC ..... B62D 25/20; B62D 25/2054; B62D 33/02
USPC ...................................................... 296/184.1
See application file for complete search history.

(56) References Cited

U.S. PATENT DOCUMENTS

| | | | | |
|---|---|---|---|---|
| 4,758,128 | A * | 7/1988 | Law ........................ | B60P 3/122 52/588.1 |
| 4,838,605 | A * | 6/1989 | Abromavage ..... | B62D 25/2054 105/422 |
| 6,174,023 | B1 * | 1/2001 | Booher .............. | B62D 25/2054 296/184.1 |
| 9,272,740 | B1 * | 3/2016 | Portenier ............... | B62D 33/02 |
| 2006/0087152 | A1 * | 4/2006 | Kuriakose .......... | B62D 25/2054 296/184.1 |
| 2011/0020589 | A1 * | 1/2011 | Kan .......................... | E04D 3/32 428/83 |
| 2019/0193794 | A1 * | 6/2019 | Beet .................... | B62D 25/2054 |

(Continued)

*Primary Examiner* — Gregory A Blankenship
(74) *Attorney, Agent, or Firm* — Barnes & Thornburg LLP

(57) ABSTRACT

An embodiment of the present disclosure provides a delivery vehicle having a driver compartment and a cargo compartment. The cargo compartment is located adjacent the driver compartment. An at least one riser extends along at least a portion of the cargo compartment. The at least one riser includes a plurality of holes disposed therein. Each of the plurality of holes disposed in the at least one riser are spaced apart from each other a predetermined distance. A flooring assembly is located in the cargo compartment and supported by the at least one riser. The flooring assembly includes: at least a plurality of floor planks; each floor plank of the at least the plurality of floor planks has a longitudinal extent, a width transverse to the longitudinal extent, a longitudinally extending tongue located at a first end of the width, and a longitudinally extending groove located at a second end of the width opposite the first end of the width; wherein the each floor plank of the at least the plurality of floor planks is fastened to one of the plurality of holes disposed in the at least one riser.

19 Claims, 24 Drawing Sheets

(56) References Cited

U.S. PATENT DOCUMENTS

| | | | |
|---|---|---|---|
| 2019/0300075 A1* | 10/2019 | Wiberg | B62D 29/008 |
| 2020/0155386 A1* | 5/2020 | Kumar | A61G 3/0808 |
| 2020/0391809 A1* | 12/2020 | Urban | B60R 13/01 |
| 2021/0129917 A1* | 5/2021 | Sagarsee | B62D 25/2054 |

* cited by examiner

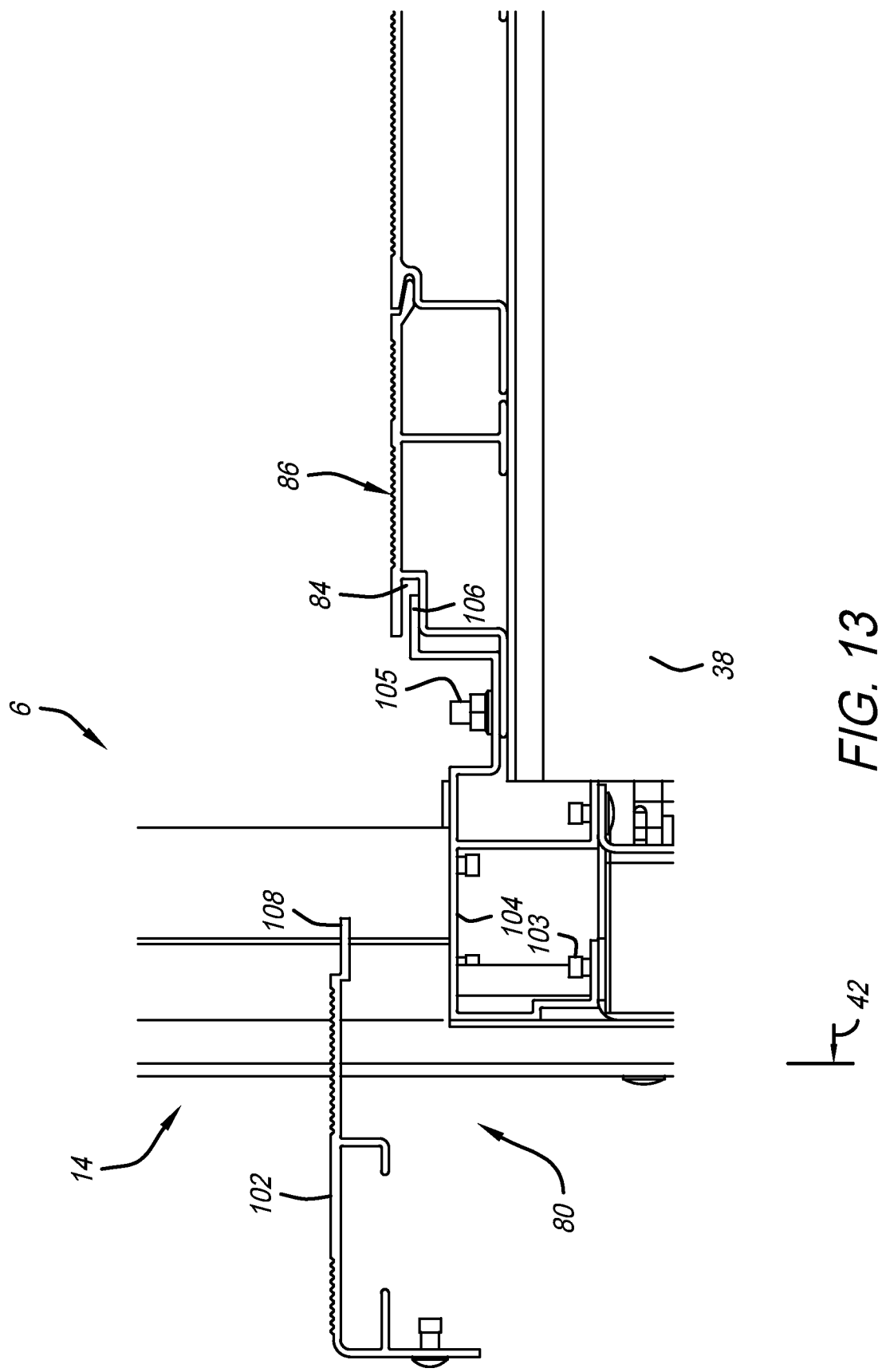

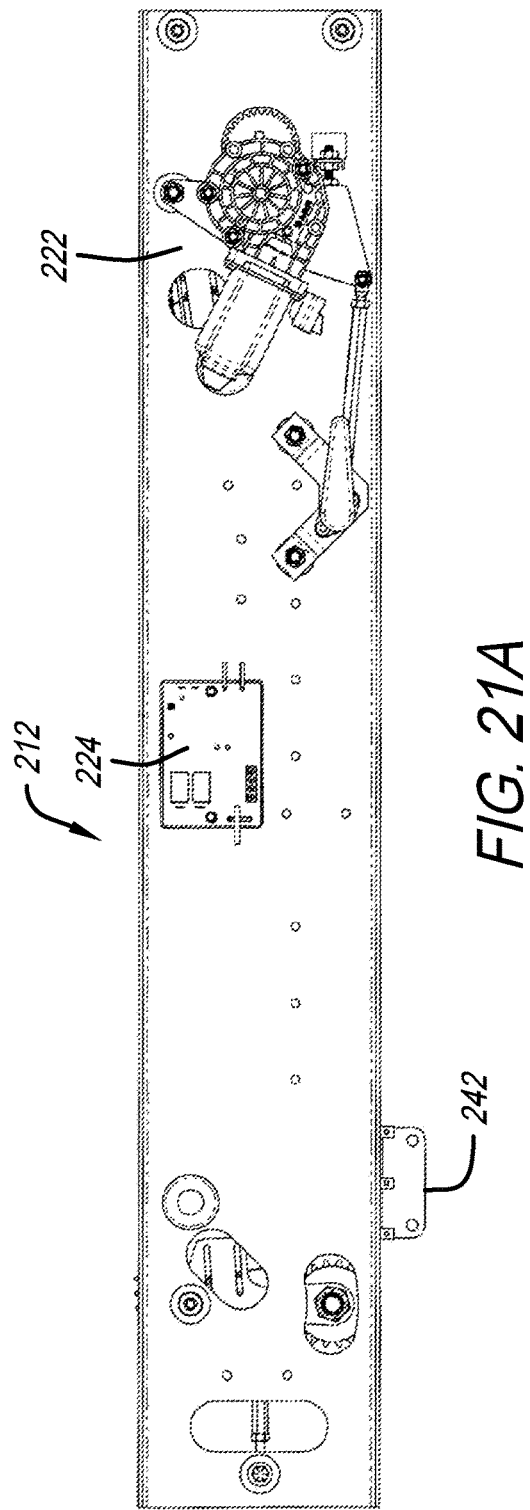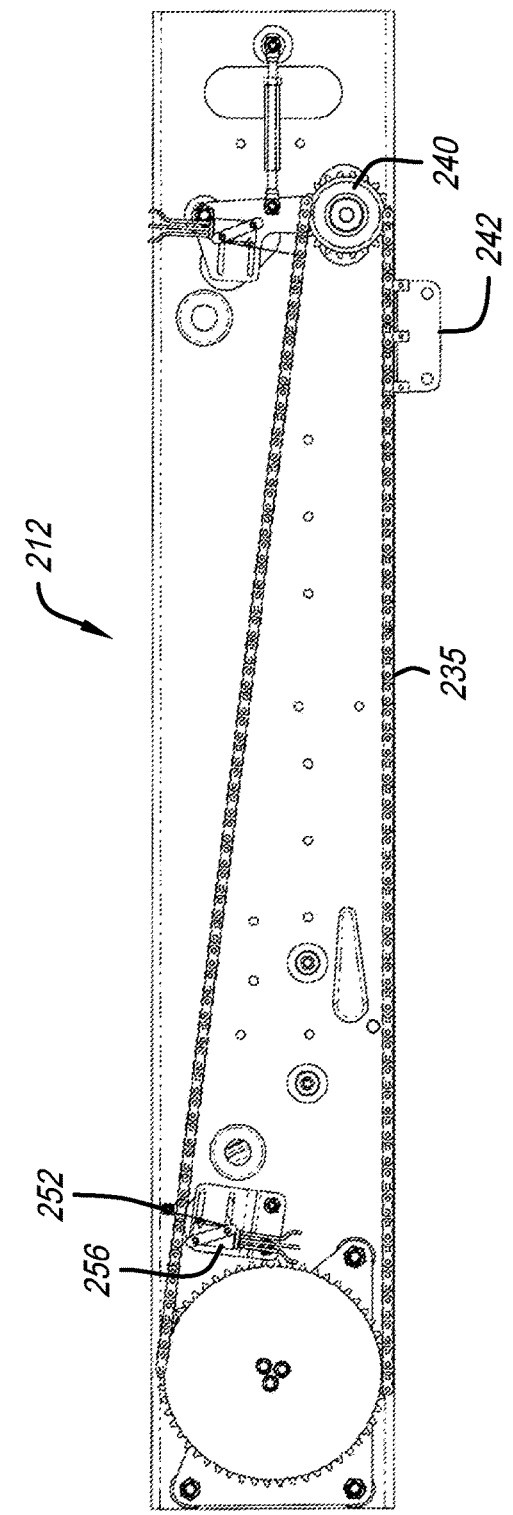
FIG. 21A
FIG. 21B

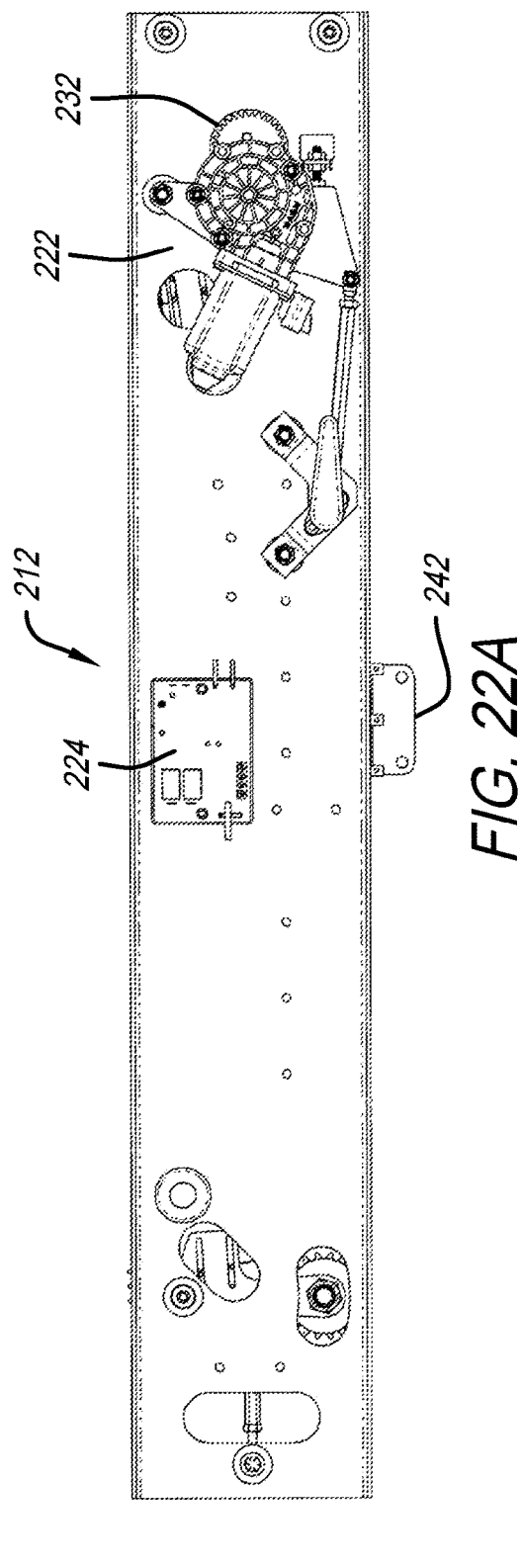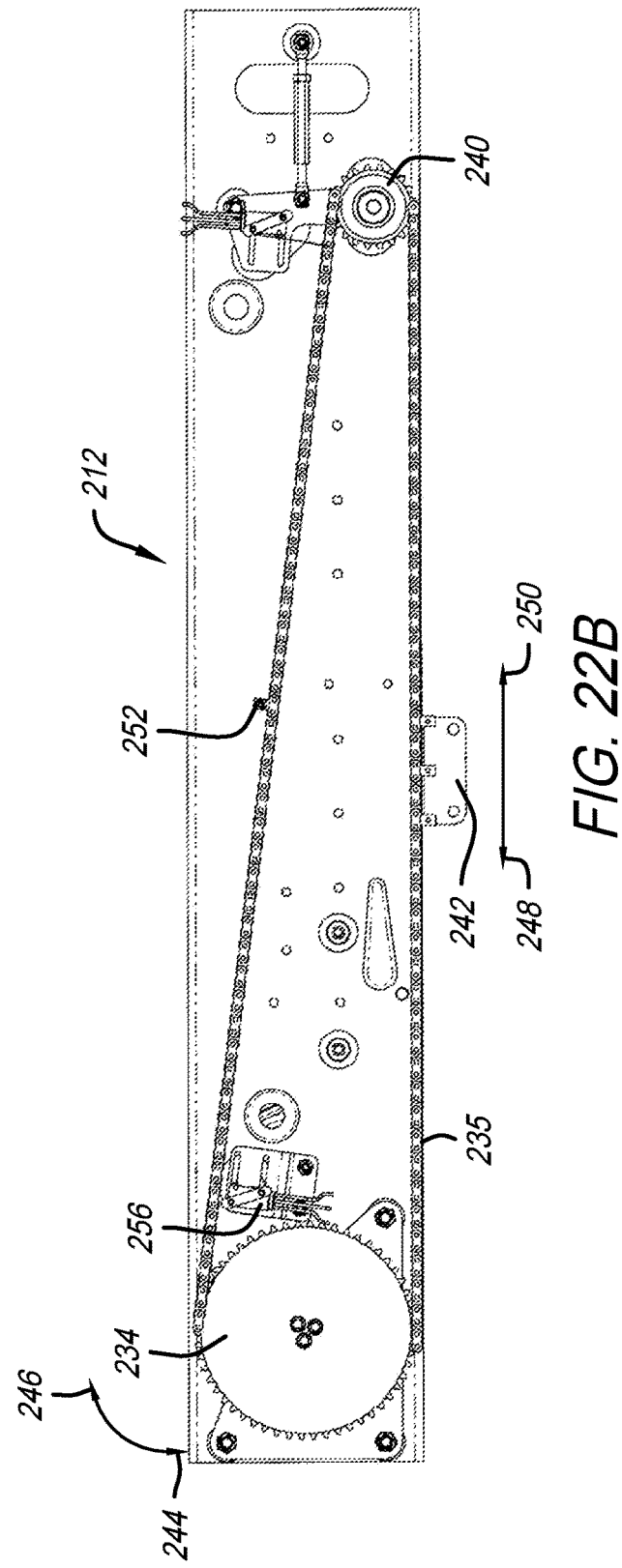
FIG. 22A
FIG. 22B

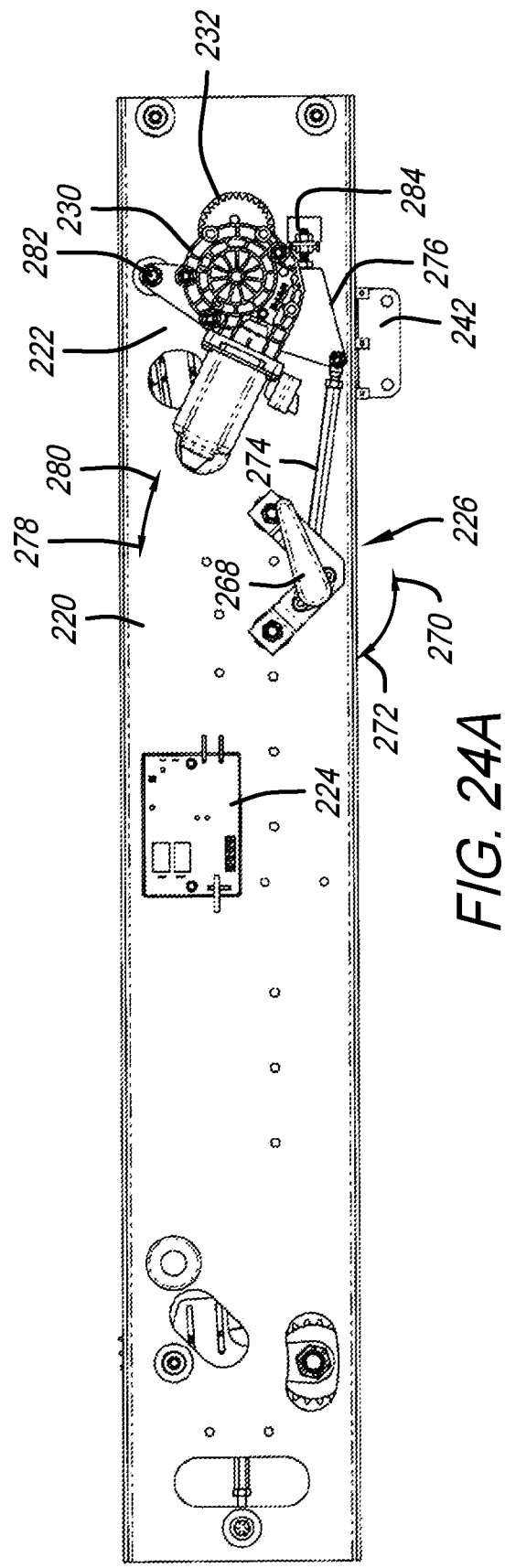
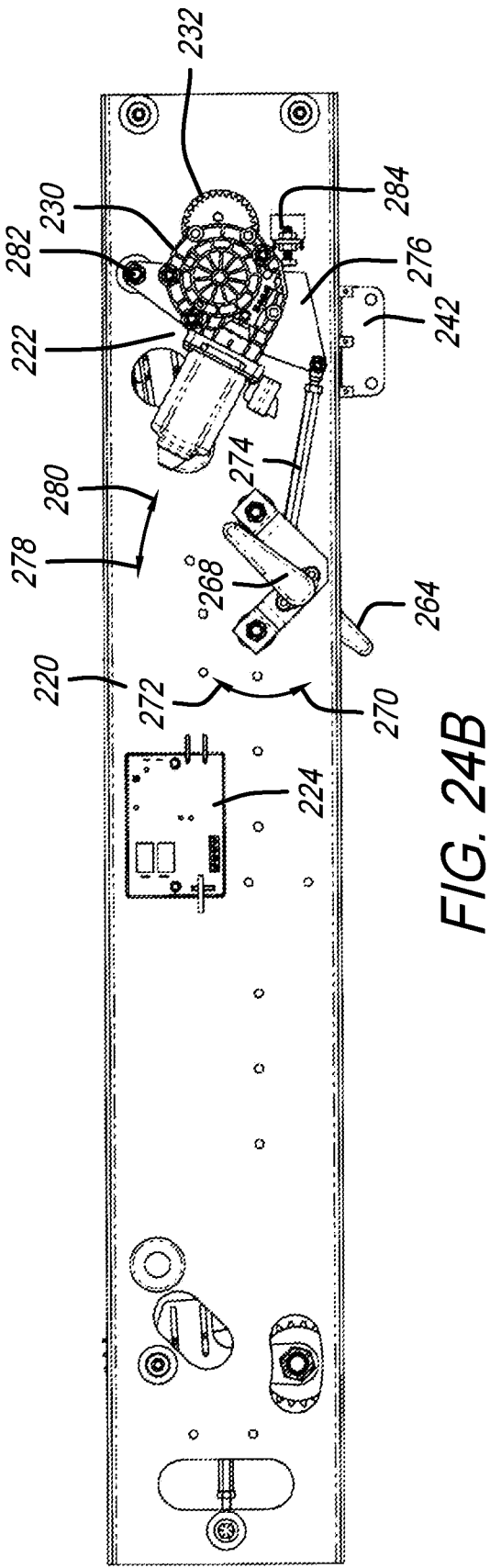

CARGO VEHICLE AUTOMATION AND CONSTRUCTION FEATURES

RELATED APPLICATIONS

The present application relates to and claims priority to U.S. Provisional Application No. 62/929,293, entitled "CARGO VEHICLE AUTOMATION AND CONSTRUCTION FEATURES," filed on Nov. 1, 2019 and U.S. Provisional Application No. 63/105,946 entitled "CARGO VEHICLE AUTOMATION AND CONSTRUCTION FEATURES," filed on Oct. 27, 2020. The subject matter disclosed in the Provisional Applications is hereby expressly incorporated into the present Application.

TECHNICAL FIELD AND SUMMARY

The present disclosure relates to delivery/cargo vehicles. More particularly, the present disclosure relates to construction features such as a floor plank assembly and sliding doors for delivery/cargo vehicles.

Delivery/cargo vehicles typically include forward cab and rearward cargo area sections. A typical cargo compartment or area is sized to hold packages, supplies, uniforms, laundry, etc. for delivery and pickup. Such delivery vehicles are commonly used by companies such as UPS, FedEx, Cintas, Aramark, G&K Services, and Unifirst, just to name a few. The importance of these vehicles has increased over the years in light of increased online shopping and delivery models that allow customers to purchase product(s) from a computer and have the product(s) delivered directly to the customer's location shortly after purchase. Because of this, both the need and efficiency of delivery/cargo vehicles has increased.

An illustrative embodiment of the present disclosure provides a delivery vehicle that comprises a driver compartment and a cargo compartment. The cargo compartment is located adjacent the driver compartment. At least one riser extends along at least a portion of the cargo compartment. The at least one riser also includes a plurality of holes disposed therein. Each of the plurality of holes disposed in the at least one riser are spaced apart from each other a predetermined distance. A flooring assembly is located in the cargo compartment and supported by the at least one riser. The flooring assembly includes: at least a plurality of floor planks; wherein each floor plank of the at least the plurality of floor planks has a longitudinal extent, a width transverse to the longitudinal extent, a longitudinally extending tongue located at a first end of the width, and a longitudinally extending groove located at a second end of the width opposite the first end of the width; wherein at least one floor plank of the at least the plurality of floor planks has a width greater than a width of another floor plank of the at least the plurality of floor planks; wherein the each floor plank of the at least the plurality of floor planks is positioned such that the tongue located at the first end of the width of the each floor plank of the at least the plurality of floor planks is positioned in the longitudinally extending groove of an adjacent floor plank of the at least the plurality of floor planks; wherein a distance the tongue of a first floor plank of the at least the plurality of floor planks extends into the longitudinally extending groove of its adjacent floor plank of the at least the plurality of floor planks is not identical to a distance the tongue of a second floor plank of the at least the plurality of floor planks extends into the longitudinally extending groove of its adjacent floor plank of the at least the plurality of floor planks; wherein the each floor plank of the at least the plurality of floor planks is fastened to one of the plurality of holes disposed in the at least one riser; an end plank that includes a longitudinal extent, a width transverse to the longitudinal extent, a longitudinally extending tongue located at a first end of the width of the end plank, and a longitudinally extending channel located at a second end of the width of the end plank opposite the first end of the width of the end plank; wherein the longitudinally extending tongue of the end plank extends into the longitudinally extending groove of its adjacent floor plank of the at least the plurality of floor planks; and a threshold plank coupled to a rear section of the cargo compartment; wherein the threshold plank has a longitudinal extent, a width transverse to the longitudinal extent of the threshold plank, and a longitudinally extending tongue bar located at a first end of the width of the threshold plank; and wherein the longitudinally extending tongue bar of the threshold plank extends into the longitudinally extending channel of the end plank.

In the above and other illustrative embodiments, the delivery vehicle may further comprise: the longitudinally extending tongue bar of the threshold plank being wider than the longitudinally extending tongue of the each floor plank of the at least the plurality of floor planks; the end plank located adjacent the threshold plank has a deeper longitudinally extending groove than the longitudinally extending groove of the each floor plank of the at least the plurality of floor planks; the each of the plurality of holes disposed in the at least one riser spaced apart from each other the predetermined distance is equidistant between the each of the plurality of holes; a depth to which the longitudinally extending tongue bar of the threshold plank extends into the longitudinally extending channel of the end plank is dependent on the width of the end plank; the each floor plank of the at least the plurality of floor planks includes a base with at least one hole disposed there through; the at least one hole disposed through the base aligns with the one of the plurality of holes disposed in the at least one riser; the at least one hole in the base and the at least one hole in the at least one riser receive a fastener to secure the floor plank of the plurality of floor planks to the at least one riser; the each floor plank of the at least the plurality of floor planks includes a foot member that supports the floor plank on the at least one riser; the tongue bar of the threshold panel comprises a first panel and a second panel both located adjacent the end plank; and the end plank is fastened to the at least one riser.

Another illustrative embodiment of the present disclosure provides a delivery vehicle that comprises a driver compartment and a cargo compartment. The cargo compartment is located adjacent the driver compartment. An at least one riser extends along at least a portion of the cargo compartment. The at least one riser includes a plurality of holes disposed therein. Each of the plurality of holes disposed in the at least one riser are spaced apart from each other a predetermined distance. A flooring assembly is located in the cargo compartment and supported by the at least one riser. The flooring assembly includes: at least a plurality of floor planks; each floor plank of the at least the plurality of floor planks has a longitudinal extent, a width transverse to the longitudinal extent, a longitudinally extending tongue located at a first end of the width, and a longitudinally extending groove located at a second end of the width opposite the first end of the width; wherein the each floor plank of the at least the plurality of floor planks is fastened to one of the plurality of holes disposed in the at least one riser; and wherein the each floor plank of the at least the plurality of floor planks is positioned such that the tongue located at the first end of the width of the each floor plank is positioned in the longitudinally extending groove of an adjacent floor plank of the at least the plurality of floor planks.

In the above and other illustrative embodiments, the delivery vehicle may further comprise: the at least one floor plank of the at least the plurality of floor planks having a width greater than a width of another floor plank of the at least the plurality of floor planks; a distance the tongue of a first floor plank of the at least the plurality of floor planks extends into the longitudinally extending groove of its adjacent floor plank of the at least the plurality of floor planks is not identical to a distance the tongue of a second floor plank of the at least the plurality of floor planks extends into the longitudinally extending groove of its adjacent floor plank of the at least the plurality of floor planks; an end plank that includes a longitudinal extent, a width transverse to the longitudinal extent, a longitudinally extending tongue located at a first end of the width of the end plank, and a longitudinally extending channel located at a second end of the width of the end plank opposite the first end of the width of the end plank, wherein the longitudinally extending channel has a depth greater than a depth of the longitudinally extending groove of the each floor plank of the plurality of floor planks; the longitudinally extending tongue of the end plank extends into the longitudinally extending groove of its adjacent floor plank of the at least the plurality of floor planks; a threshold plank coupled to a rear section of the cargo compartment; the threshold plank has a longitudinal extent, a width transverse to the longitudinal extent of the threshold plank, and a longitudinally extending tongue bar located at a first end of the width of the threshold plank; and the longitudinally extending tongue bar of the threshold plank extends into the longitudinally extending channel of the end plank.

Another illustrative embodiment of the present disclosure provides a delivery vehicle comprising a driver compartment and a cargo compartment. The cargo compartment is located adjacent the driver compartment. A flooring assembly is located in the cargo compartment. The flooring assembly includes: at least a plurality of floor planks; wherein each floor plank of the at least the plurality of floor planks has a longitudinal extent, a width transverse to the longitudinal extent, a longitudinally extending tongue located at a first end of the width, and a longitudinally extending groove located at a second end of the width opposite the first end of the width; wherein at least one floor plank of the at least the plurality of floor planks has a width greater than a width of another floor plank of the at least the plurality of floor planks; wherein the each floor plank of the at least the plurality of floor planks is positioned such that the tongue located at the first end of the width of the each floor plank is positioned in the longitudinally extending groove of an adjacent floor plank of the at least the plurality of floor planks; wherein a distance the tongue of a first floor plank of the at least the plurality of floor planks extends into the longitudinally extending groove of its adjacent floor plank of the at least the plurality of floor planks is not identical to a distance the tongue of a second floor plank of the at least the plurality of floor planks extends into the longitudinally extending groove of its adjacent floor plank of the at least the plurality of floor planks; an end plank that includes a longitudinal extent, a width transverse to the longitudinal extent, a longitudinally extending tongue located at a first end of the width of the end plank, and a longitudinally extending channel located at a second end of the width of the end plank opposite the first end of the width of the end plank; wherein the longitudinally extending tongue of the end plank extends into the longitudinally extending groove of its adjacent floor plank of the at least the plurality of floor planks; and a threshold plank coupled to a rear section of the cargo compartment; wherein the threshold plank has a longitudinal extent, a width transverse to the longitudinal extent of the threshold plank, and a longitudinally extending tongue bar located at a first end of the width of the threshold plank; and wherein the longitudinally extending tongue bar of the threshold plank extends into the longitudinally extending channel of the end plank.

Additional features and advantages of the floor plank assembly and construction features will become apparent to those skilled in the art upon consideration of the following detailed descriptions exemplifying embodiments of carrying out the floor plank assembly and construction features as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 13 is a side detail cross-sectional and partially exploded view of the rearward end of the cargo compartment;

FIGS. 21A and 21B are front and back views of the motorized sliding door assembly mechanism with the door bracket located in an illustrative open position;

FIGS. 22A and 22B are front and back views of the motorized sliding door assembly mechanism with the door bracket located in an illustrative partially open position;

FIGS. 24A, 24B, and 24C are front views of the motorized sliding door assembly mechanism that shows a mechanical override assembly progressing from engaged to disengaged positions.

Figure 1:
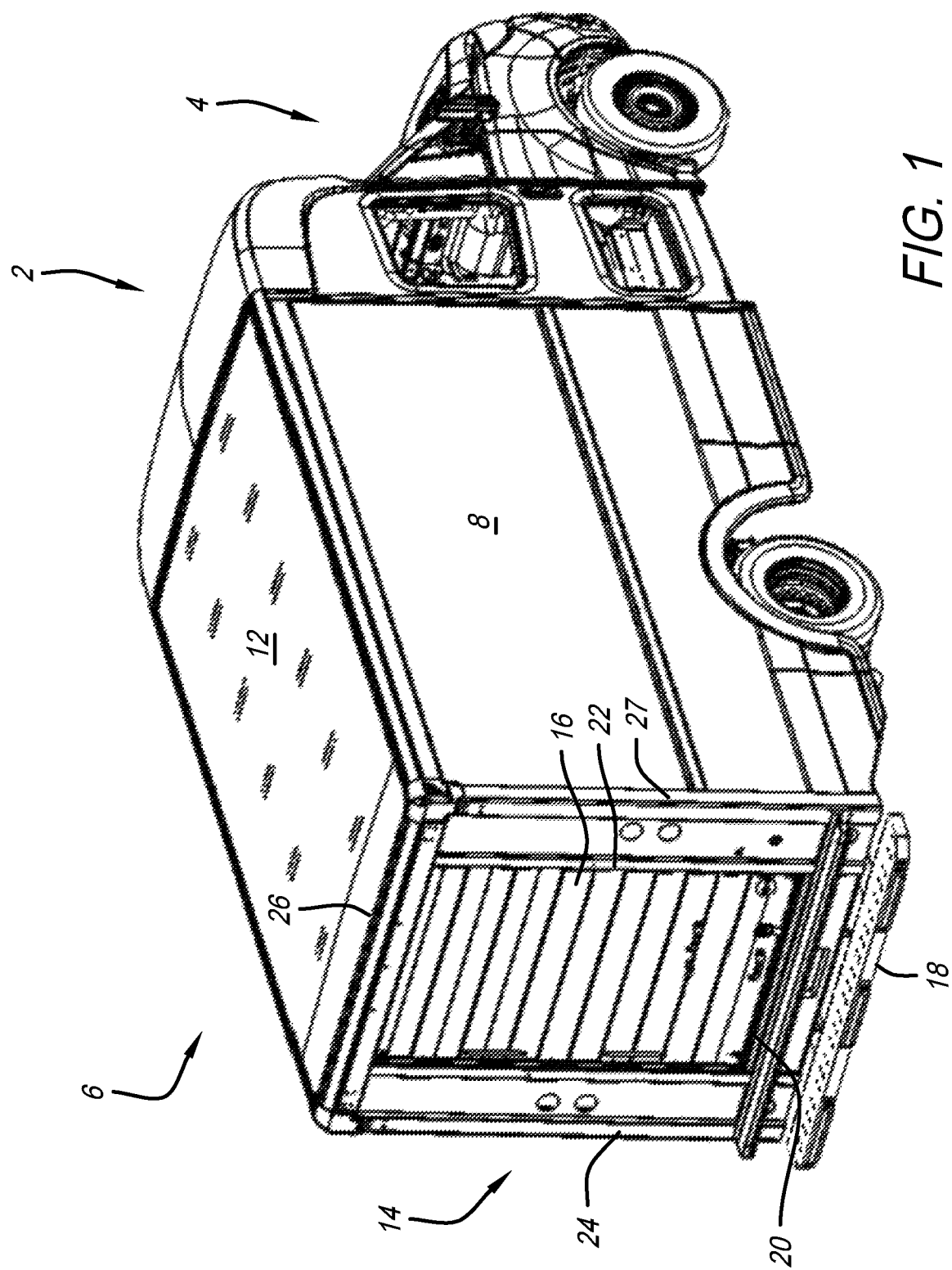
FIG. 1 is a rear perspective view of a cargo or delivery vehicle.

Corresponding reference characters indicate corresponding parts throughout the several views. The exemplification set out herein illustrates embodiments of the floor plank assembly, construction, and motorized sliding door assembly. Such exemplification is not to be construed as limiting the scope of the floor plank assembly and construction in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Part of the manufacturing process of a delivery vehicle is adding the flooring, particularly to the cargo area, and attaching the rear portion of the cargo area to the rest of the delivery vehicle once the flooring is in place. Typically, the rear wall, corners, and door area of the cargo area are attached to the rest of the delivery vehicle as one unit after the flooring has been installed.

A prior art method of installing cargo area flooring is to first create extruded aluminum floor planks. These planks are made by pushing aluminum through a die having the desired cross-sectional profile of the floor plank. The aluminum is continuously pushed through this die and cut to desired lengths. Each floor plank has a tongue extending from one side and a groove extending from the opposing side. When constructing the floor, after the first plank is installed, the tongue of the second plank is inserted into the groove of the adjacent first plank to connect them together. This process is continuously repeated along the length of the floor from the front of the cargo area to the rear.

An issue with installing such flooring is that, even though extruded aluminum planks are a preferred flooring material and construction, the steel die the aluminum is pressed through can wear over time. This means the cross-sectional profile of the extruded planks themselves will increase over time. This translates into floor planks of essentially different sizes being installed together to form the floor structure. The result, which is a known issue, is the exact length of the floor from front to rear will not be known until all the flooring is installed. There is a known size variance because of the different size floor planks that will exist at the rear of the delivery vehicle. Essentially, the floor structure has the propensity to be either too long or too short. In other words, each floor plank has a tolerance—plus or minus particular dimensions—that when all the floor planks are installed, will create this variance. Because of this, the floor structure is installed so that it comes up short some distance from the rear of the vehicle.

Once the floor structure is installed, the rear of the cargo area is installed as one unit. A consequence of this is that there will be a gap between the rear structure of the delivery vehicle and the end of the floor structure. A prior art remedy is to install a filler panel between the rear section of the delivery vehicle and the last plank of the floor structure. That filler panel then receives a plurality of bolts on each side—one line of bolts securing to the last flooring plank, and another line of bolts securing to the rear structure of the vehicle. There can be as many as 22 bolts (44 total) attached to each side of the filler panel. This requires substantial manufacturing time and effort.

An illustrative embodiment of the present disclosure, therefore, provides a flooring assembly that no longer requires this separately bolted filler panel between the rear of the cargo compartment or area and the last floor plank. Instead, an illustrative embodiment of the present disclosure provides a flooring structure that accounts for this variation in width. The floor planks are regularly spaced apart from each other despite their slight difference in size. Each floor plank includes a tongue on one side and a groove on an opposite side such that the tongue of one plank is received in the groove of an adjacent plank. This arrangement allows for a variance in width of each floor plank despite each floor plank being regularly spaced apart. Before the rear structure of the delivery vehicle is attached to the end of the cargo compartment, a threshold plank is attached to this rear structure. When attached to the delivery vehicle, the threshold plank, which also includes a tongue, is positioned adjacent the last plank of the flooring assembly. The tongue of the threshold plank is received in the groove of the last plank to complete the flooring structure. The tongue of the threshold plank may be larger than the tongues of the other floor planks to account for any additional variance in the flooring structure so that a complete flooring assembly is created between front and rear ends of the cargo compartment and without the need of additional expense in fastening a filler panel onto the end floor plank and rear structure.

Such flooring structure may include a plurality of floor planks wherein each has a tongue extending from one side of the plank and a groove extending from the other side. Risers are employed underneath the floor structure and attached to the chassis. The risers are pre-drilled so each floor plank can be easily installed onto the risers. The variance in plank size, which will still exist with these new floor planks, is accounted for when predrilling the holes in the riser. How the tolerance manifests is by the varying distance that exists between each floor plank. The tolerance is particularly accounted for by how far the tongue from a subsequent plank will be fitted into the groove of the previously installed plank. Such a floor system, having predrilled holes will remove this tolerance stackup. The only tolerance stackup will be in the risers hole to hole location and riser to riser location. This tolerance, however, is believed small. Illustratively, the holes may be equidistant apart.

Additionally, the tolerance that exists because of the variance in riser location for the overall floor structure will be accounted for by the addition of a threshold plank that is fastened to both the end section of the vehicle and the riser under the floor structure. Each of the floor planks is fastened to the riser via bolts. It is contemplated in the illustrative embodiment that the holes in the floor plank base, as well as the risers themselves, will be predrilled to maintain ease of assembly.

The threshold plank attached to the rear section of the delivery vehicle will include a tongue bar of larger length from front to rear than the other tongues of the floor planks. The final plank or end plank, positioned on the risers prior to the threshold plank, also has an enlarged slot or channel. The tongue bar and channel of the threshold plank and the end plank, respectively, have sufficient length to accommodate the tolerance of the floor assembly sizes. The extent to which the tongue bar will fit into the channel will be dependent on how much tolerance in the floor riser structure exists. If the tolerances are such that the floor riser structure is shorter, there will be greater distance between the end plank and the threshold plank. Conversely, if the tolerances result in a longer floor riser structure from front to rear, the threshold and end planks will be closer to each other. In either instance the tongue bar and channel will create their own filler panel to accommodate the variance in floor assembly length or size from truck to truck.

A rear perspective view of a cargo or delivery vehicle 2 is shown in FIG. 1. Delivery vehicle 2 includes a driver compartment 4 and cargo compartment 6 located adjacent thereto. With respect to cargo compartment 6, it includes upward extending sidewalls 8 and 10 (see, also, FIG. 2) with a roof panel 12 extending therebetween overhead. Opposite driver compartment 4 is rear section 14. In this illustrative embodiment of delivery vehicle 2, rear section 14 includes an upward opening door opening 16, step bumper 18, and sill 20. It is appreciated that door opening 16 may be any variety of door style including swing, fold-up, or sliding, for example. Step bumper 18 may serve as both a bumper and a step to access cargo compartment 6. Sill 20 is located at the base of opening 22 about a periphery of door opening 16 and is the edge of the interior of cargo compartment 6. Frame members 24, 26, and 27 illustratively bound rear section 14 of delivery vehicle 2.

Figure 2:
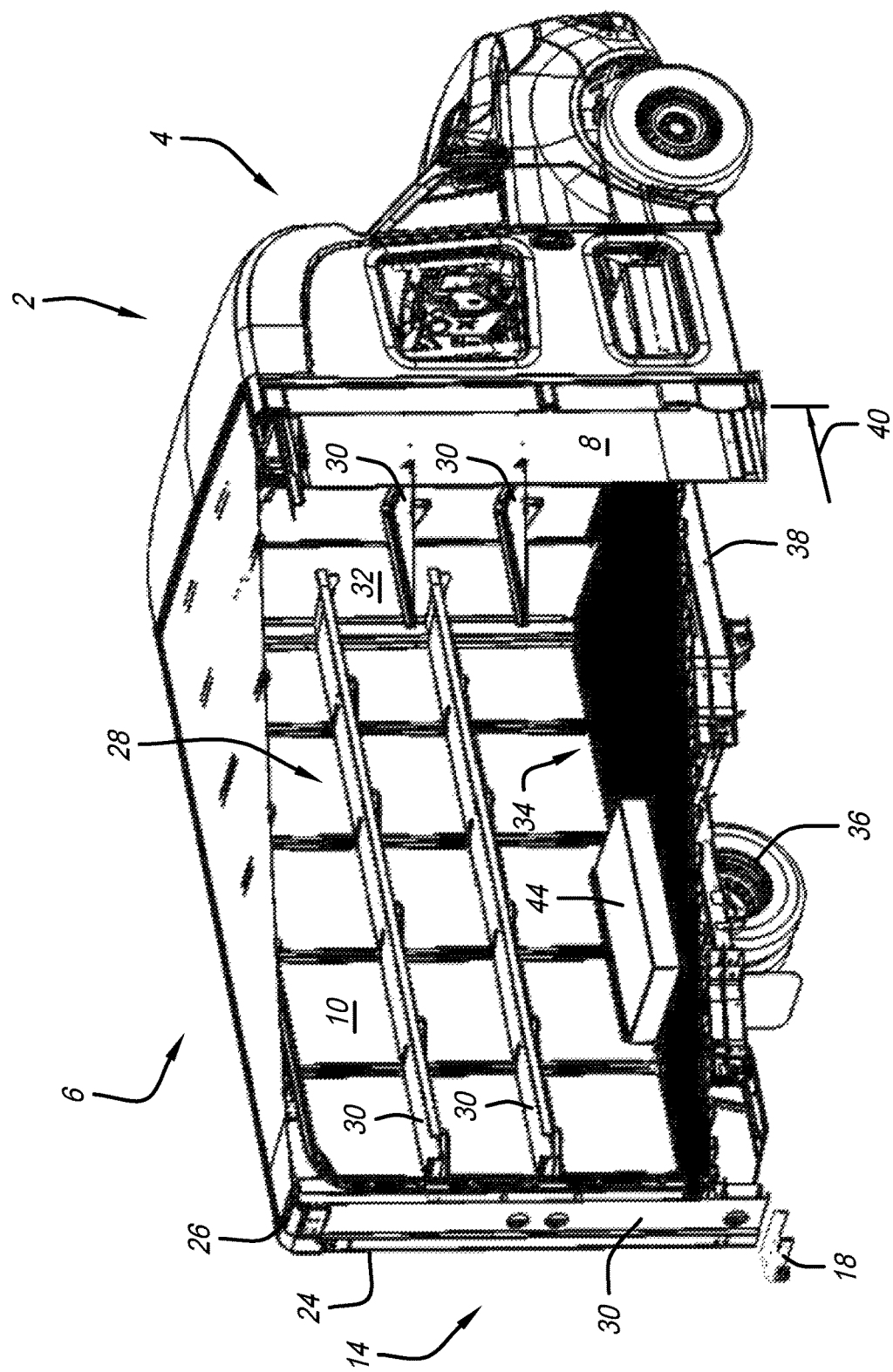
FIG. 2 is a partial cutaway rear perspective view of the cargo or delivery vehicle.

A partial cutaway rear perspective view of delivery vehicle 2 is shown in FIG. 2. Here, delivery vehicle 2 is also shown with driver compartment 4 and cargo compartment 6, the latter of which has been partially cutaway to expose interior cargo area 28. In this illustrative embodiment, shelving 30 illustratively lines upward extending sidewalls 8 and 10. It is appreciated that other structures may be employed in interior cargo area 28 to suit any particular needs for delivery vehicle 2.

Also shown herein is a portion of rear section 14, including frame members 24 and 26, along with a portion of shelving 30 and step bumper 18. An interior bulkhead wall 32 separates driver compartment 4 from cargo compartment 6. Also shown in this view is flooring assembly 34 supported by risers 36 and 38 running between forward 40 and rearward 42 of interior cargo area 28. In this illustrative embodiment, flooring assembly 34 surrounds wheel well 44 also located within interior cargo area 28. It is appreciated that such wheel well 44 or other like structures may break up the size of flooring assembly 34. In other embodiments, there may be no such wheel well or other obstructions allowing flooring assembly 34 to be uninterrupted or unobstructed from forward 40 and rearward 42 of interior cargo area 28.

Also shown in FIG. 2 is flooring assembly 34 extending to rear section 14 at rearward 42 of interior cargo area 28. Such flooring assembly 34 is made from rows of longitudinally extending planks illustratively running between sidewalls 8 and 10 from forward 40 to rearward 42 of interior cargo area 28. The longitudinally extending planks illustratively run from sidewall to sidewall and the width of each plank when joined together form the length of flooring assembly from forward 40 to rearward 42 of interior cargo area 28.

Figure 3:
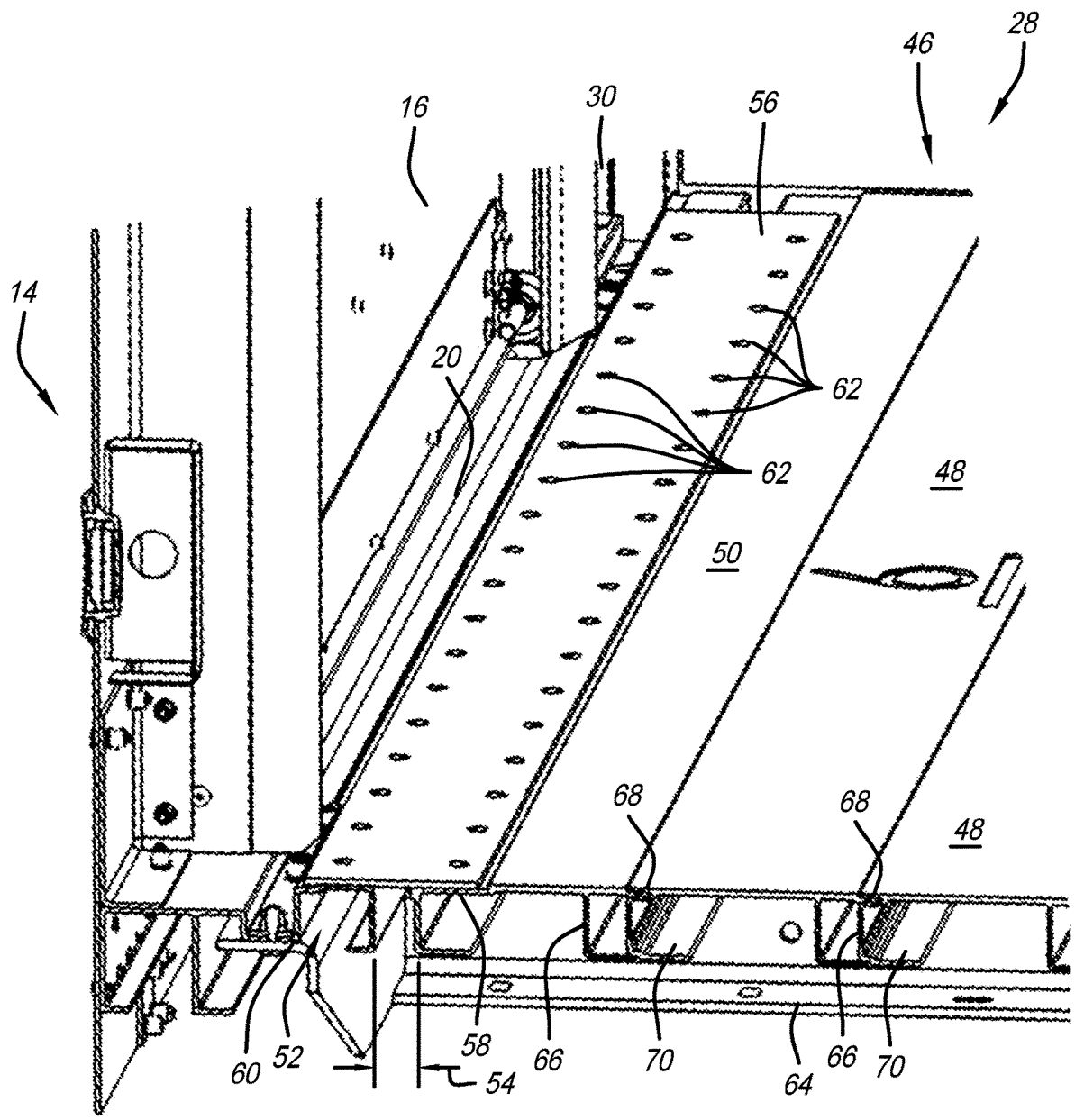
FIG. 3 is a perspective view of a portion of a PRIOR ART floor structure in an interior cargo area of a delivery vehicle.

A perspective view of a portion of a prior art floor structure 46 in interior cargo area 28 is shown in PRIOR ART FIG. 3. In this view, prior art floor structure 46 extends between the sidewalls toward rearward 42 of interior cargo area 28. Here, prior art floor planks 48 longitudinally extend from sidewall to sidewall and between forward 40 to rearward 42 of interior cargo area 28 forming prior art floor structure 46. A prior art final plank 50 is the last plank to be positioned adjacent rear section 14 of cargo compartment 6. As shown, door opening 16, shelving 30, and sill 20 are components of rear section 14. Illustratively, part of sill 20 includes support 52 that spans about the width of rear section 14.

A gap 54 is located between prior art final plank 50 and support 52 to supply a tolerance in prior art floor structure 46, since the width of each prior art floor plank 48 may be slightly different. For construction purposes, the tolerance provided by gap 54 accounts for the possible different lengths of floor structure 46 based on the potentially different widths of each floor plank 48. Prior art floor structure 46 is intentionally designed to be shorter than the full length forward 40 to rearward 42 of interior cargo area 28 to account for the different width floor planks. The result, however, is that the floor will always be shorter than full length forward 40 to rearward 42 of interior cargo area 28. This is embodied by gap 54.

An illustrative construction method for delivery vehicle 2 includes attaching rear section 14 to the end of cargo compartment 6 as generally a single unit. As such, gap 54 ensures that there will be sufficient space between prior art final plank 50 and support 52 of sill 20. Otherwise, rear section 14 might not fit properly onto cargo compartment 6 because of prior art floor structure 46 being too long. Intentionally creating this gap 54 ensures rear section 14 will attach onto cargo compartment 6 without interference by prior art floor structure 46. A consequence of gap 54, however, is that there is now a gap in floor structure 46 of cargo compartment 6 right adjacent sill 20 and door opening 16. This may create a hazard to persons entering and exiting interior cargo area 28. In order to mitigate this hazard, a longitudinally extending filler panel 56 extends from one side of cargo compartment 6 to the other in order to shroud gap 54. As further shown in PRIOR ART FIG. 3, filler panel 56 is a flat plate that sits atop surface 58 of prior art final plank 50 and surface 60 of support 52, spanning across gap 54. To keep filler panel 56 in place, a plurality of fasteners 62 are disposed in dual rows as shown with one row of fasteners 62 disposed through filler panel 56 and prior art final plank 50. A second row of fasteners 62 are disposed through both filler panel 56 and support 52. As shown, these dual rows of fasteners 62 keep filler panel 56 in place and attached to prior art final plank 50 and sill 20.

As depicted herein, a sufficient number of fasteners 62 are attached on each side to run about the length of filler panel 56. As many as 22 fasteners in each row are disposed through filler panel 56 to secure it in place. An effect of this, however, is additional manufacturing time, expense, and effort to attach all of these fasteners.

Also shown in PRIOR ART FIG. 3 is riser 64 upon which floor planks 48 are supported. It is appreciated (although not shown) that these prior art floor planks 48 are jammed together making each floor structure a unique length and create the needed gap. On one side of each prior art floor plank 48 is a tongue 66 illustratively running the length of prior art floor plank 48. On the opposite side of the width of prior art floor plank 48 is a groove 68 sized to receive tongue 66 from an adjacent prior art floor plank 48 as shown. This tongue-and-groove arrangement allows prior art floor structure 46, for the most part, to be free of these visible fasteners (sans fasteners 62 on filler panel 56).

Figure 4:
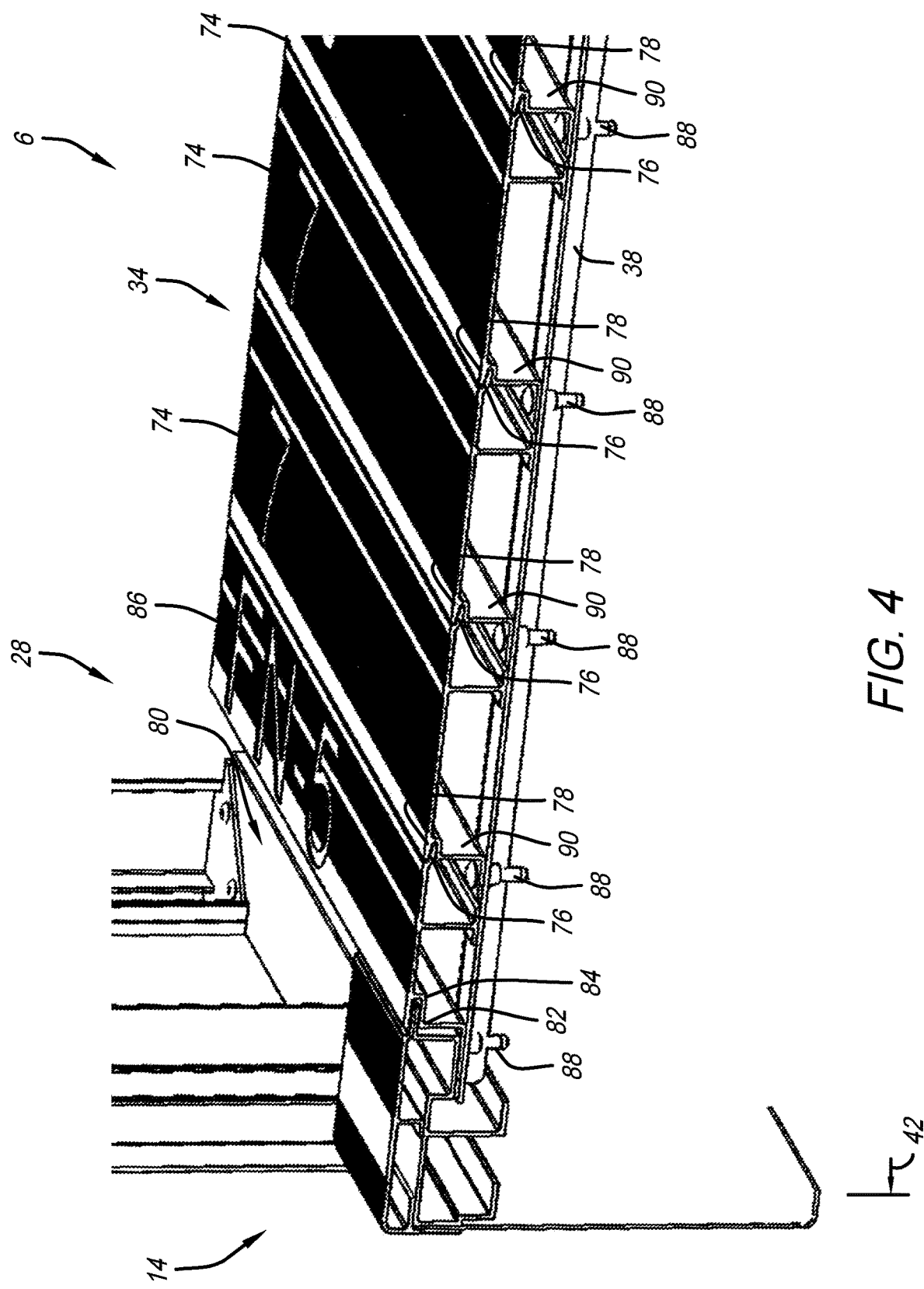
FIG. 4 is a perspective view of a portion of a flooring assembly at about rearward of the interior cargo area of the cargo compartment of the delivery vehicle.

Another perspective view of a portion of flooring assembly 34, at about rearward 42 end of interior cargo area 28 of cargo compartment 6, is shown in FIG. 4. In contrast to prior art floor structure 46, flooring assembly 34 shown in this view does not employ a filler panel to cover a gap between a final floor plank and the rear section of the cargo compartment. Flooring assembly 34 still includes a gap at its end because risers 36 and 38 will still have a tolerance between its predrilled holes that secure each floor plank.

Flooring assembly 34 includes a plurality of floor planks 74 that include opposed tongues 76 and grooves 78 on their peripheries and have sizes (particularly widths) that may vary from floor plank 74 to floor plank 74, similar to that described with respect to prior art floor plank 48. Instead of using filler panel 56, however, a threshold plank 80 is employed at rear section 14 instead of sill 20 to engage flooring assembly 34. To that end, threshold plank 80 includes a tongue bar 82, extending therefrom and into channel 84 of an end plank 86 to account for the variance in length of flooring assembly 34. The extended width of tongue bar 82, combined with an extended depth of channel 84, creates a surface for flooring assembly 34 at rearward 42 end of interior cargo area 28.

Also shown in this view are fasteners 88, each disposed through a base section 90 of each of floor plank 74 and secured to riser 38 of cargo compartment 6. Although not shown, such fasteners 88 may also attach floor planks 74 at a spaced apart location of base section 90 onto spaced apart riser 36, as well. Illustratively, holes can be disposed in risers 36 and 38 at predetermined distances along their longitudinal length and each of floor plank 74 secured to risers 36 and 38 at those predetermined locations. Tongues 76 and corresponding grooves 78, on each of floor plank 74, may be larger than prior art floor planks to account for the variance in size of each of floor planks 74, despite the exact amount of variance not per se being known. Nonetheless, this still allows the floor plank 74 to be secured to risers 36 and 38 at predetermined locations along risers 36 and 38.

Threshold plank 80, which can be initially attached to rear section 14 prior to assembly of delivery vehicle 2, can have its tongue bar 82 inserted into channel 84 of end plank 86 during the assembly process of delivery vehicle 2, thus, completing the flooring of interior cargo area 28 without having to spend the time and expense of attaching filler panel 56 with its plurality of fasteners 62. It, thus, becomes evident that this new flooring assembly 34 with threshold plank 80 eases manufacture, while still providing a complete flooring system with no exposed gap.

Figure 5:
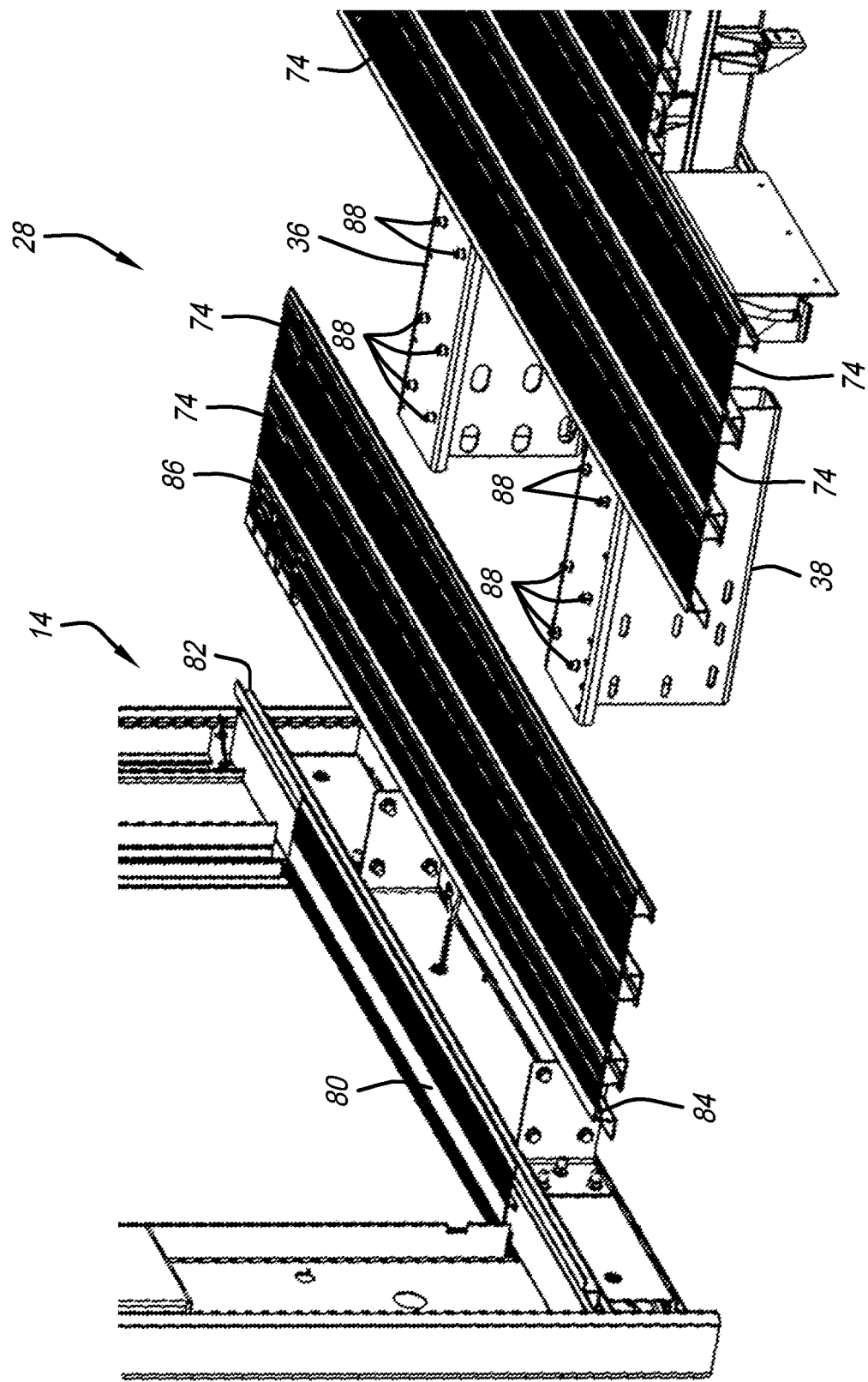
FIG. 5 is a partially exploded detail view of a portion of the interior cargo compartment of the delivery vehicle.

A partially exploded detail view of a portion of interior cargo compartment 28 is shown in FIG. 5. As depicted, rear section 14 is separate from risers 36 and 38. Again, during construction of delivery vehicle 2, it is common for rear section 14 of cargo compartment 2 to be attached thereto as a single unit. Threshold plank 80 is shown attached to rear section 14 to mate with end plank 86 which is coupled to floor planks 74. In this view, certain floor planks 74 are shown already attached to risers 36 and 38, while additional floor planks 74 and end plank 86 are to be installed in anticipation of receiving threshold plank 80. With all of floor planks 74 and end plank 86 installed on risers 36 and 38, rear section 14, with threshold plank 80 attached thereto, can be moved into position so tongue bar 82 can extend into channel 84 of end plank 86. With that engagement, rear section 14 can be attached to risers 36 and 38, and to the rest of cargo compartment 6, to complete that portion of assembly of delivery vehicle 2.

Figure 6A:
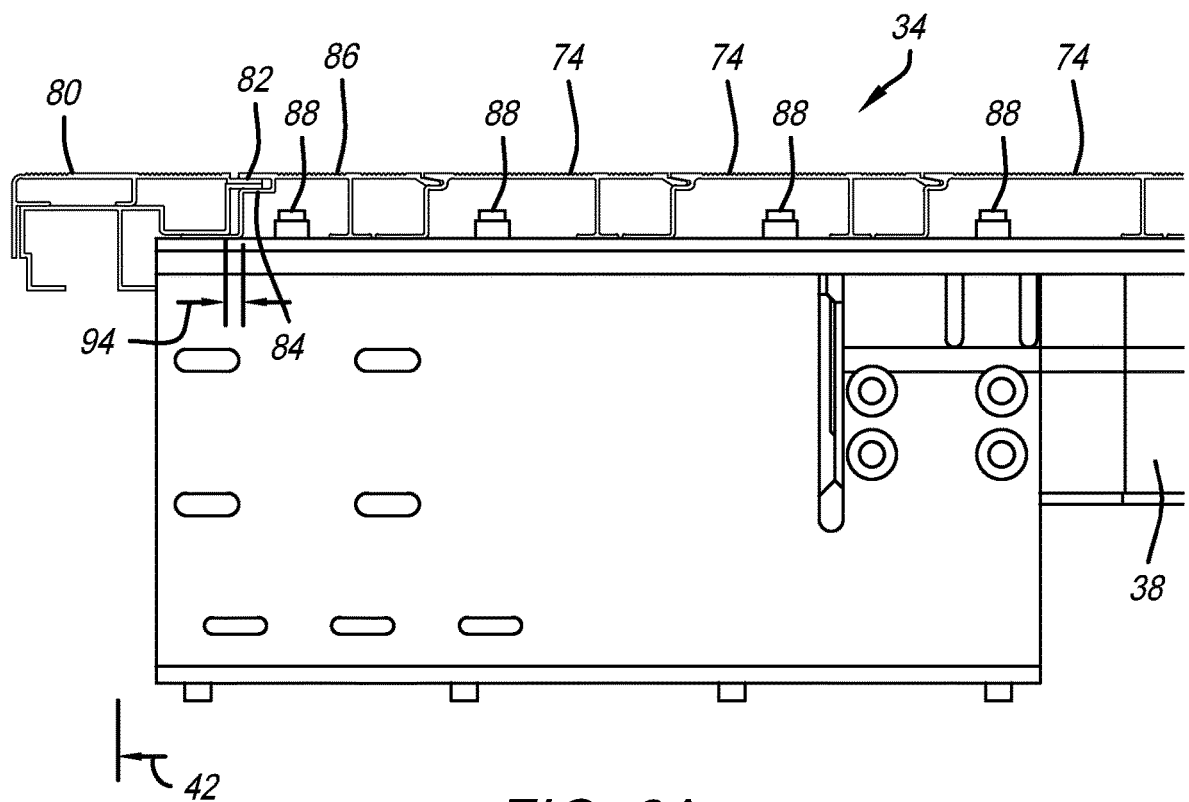
FIGS. 6A and 6B are side cross-sectional views of the flooring assembly attached to the riser.
Figure 6B:
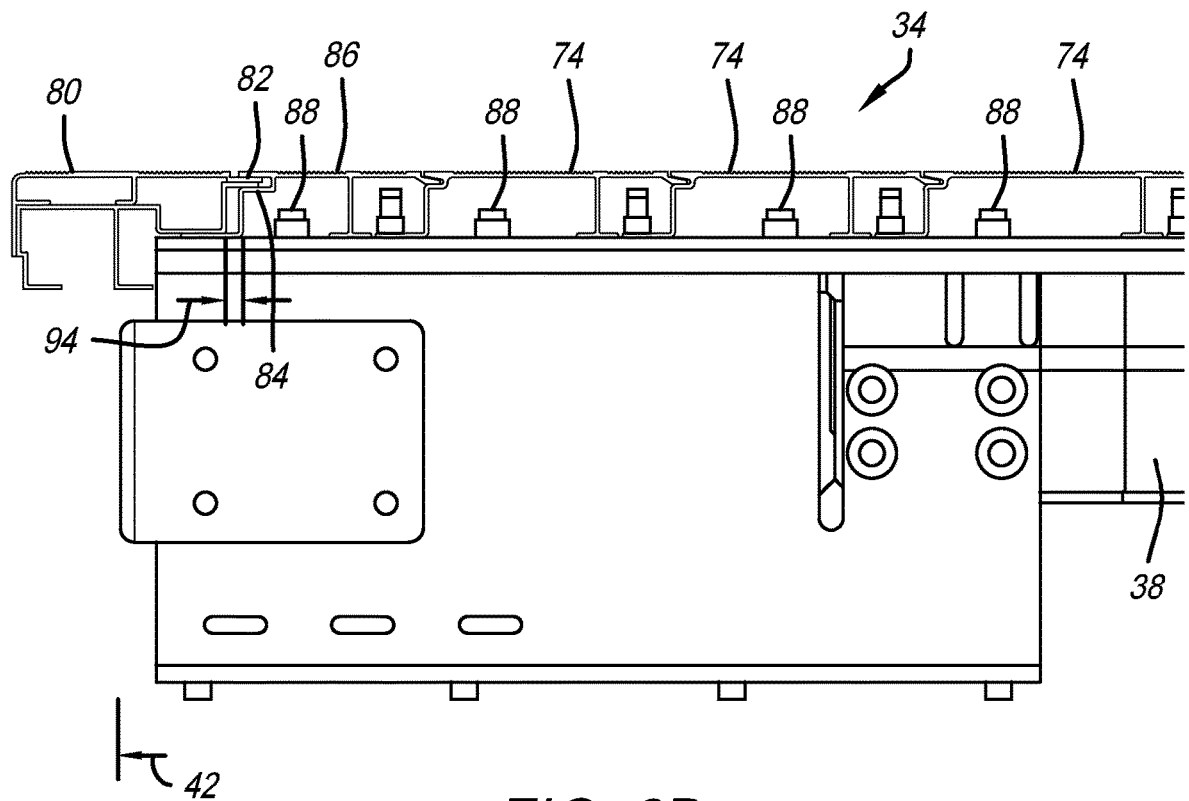

Side cross-sectional views of flooring assembly 34 attached to the riser 38 are shown in FIGS. 6A and 6B. Both of these views show individual floor planks 74 attached to risers 38 via fasteners 88. Also shown in these views are end planks 86 likewise fastened to risers 38 via fasteners 88 and threshold planks 80 engaged with end planks 86. The distinction between the flooring assemblies 34 in FIG. 6A, compared to FIG. 6B, is that in the latter, flooring assembly 34 is slightly shorter than flooring assembly 34 shown in FIG. 6A. This is evidenced by the wider gap 92 visibly seen in FIG. 6B. In contrast, narrower gap 94 is visible in FIG. 6A. Because risers 36 and 38 are predrilled to attach to floor planks 74, any tolerance stackup of plank widths is substantially eliminated. End plank 86 may terminate at a slightly different distance at rearward 42 end from cargo compartment 6 of one vehicle delivery 2 to another due to the hole location tolerance on risers 36 and 38 for floor planks 74 to fasten to. In either case, however, tongue bar 82 still extends into channel 84 in both views effectively covering either gaps 92 and 94. It is further appreciated by these contrasting views that, in either case, when installing rear section 14 onto cargo compartment 6, regardless of where end plank 86 ultimately sits on risers 36 and 38, tongue 82 may simply fit into channel 84 to complete flooring assembly 34 with no break in the flooring and without attaching a separate filler panel.

Figure 7:
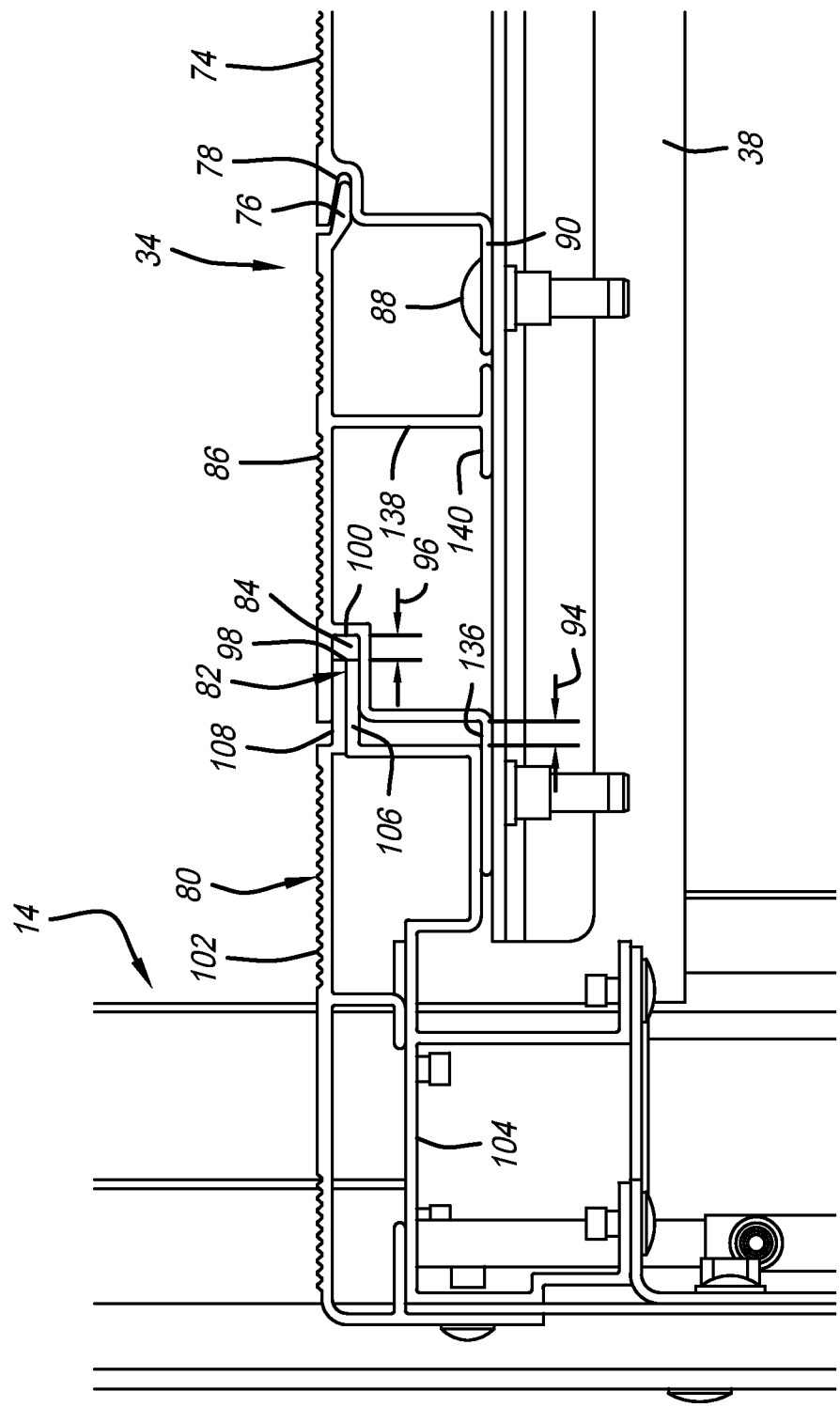
FIG. 7 is a side cross-sectional detail view of a portion of the flooring assembly, riser, and rear section.

A side cross-sectional detail view of a portion of flooring assembly 34, riser 38, and rear section 14 are shown in FIG. 7. This view depicts how a tongue 76 engages an adjacent groove 78 to fit the floor planks 74 together to form flooring assembly 34. This view also shows how tongue bar 82 of threshold plank 80 fits into channel 84 of end plank 86 to complete flooring assembly 34. In this particular case, because of the end length of flooring assembly 34, gap 94 exists between threshold plank 80 and end plank 86. Likewise, there is a gap 96 between end 98 of threshold plank 80 and end 100 in channel 84 of end plank 86. This allows the variance of flooring assembly 34 to exist while allowing rear section 14 to be attached to cargo compartment 6.

Also shown in this view is that depending on the design and construction needs, the threshold plank may be composed of multiple components, such as a top tread section 102 and lower support section 104. In certain embodiments, lower tread section may include its own tongue bar portion 106 that can be inserted into channel 84 during attachment of rear section 14, and then channel portion 108 of top tread section 102 being attached thereafter. Regardless, this assembly is easier, more cost-effective, and more efficient than conventional construction methods requiring installing filler panel 56 with fasteners 62, as shown in PRIOR ART FIG. 3, for example.

Figure 8:
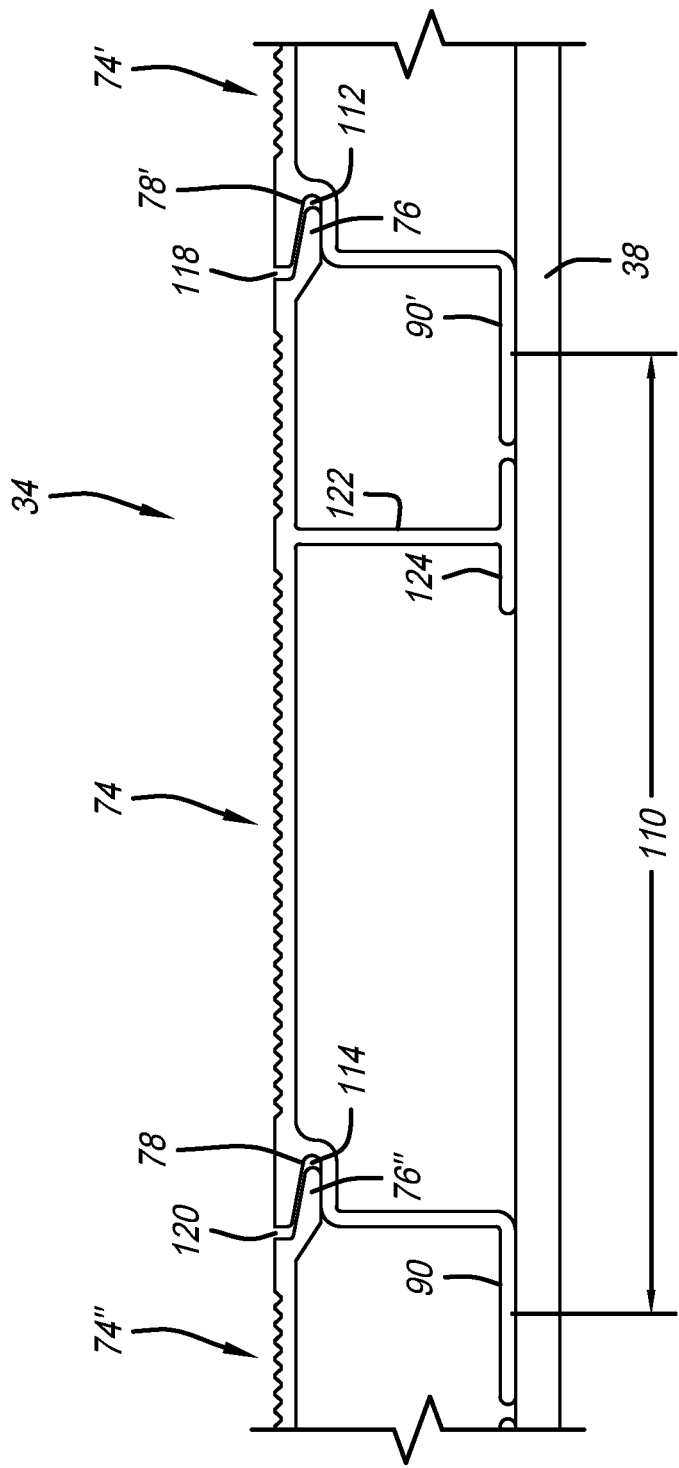
FIG. 8 is a side detail view of a portion of the interior cargo area showing floor planks installed on the riser.

A side detail view of a portion of interior cargo area 28, showing floor planks 74 installed on riser 38, is shown in FIG. 8. This view depicts how different widths of floor planks 74 may be accommodated when installing flooring assembly 34. For example, floor plank 74 has a tongue 76 extending from the width at one side and a groove 78 disposed in the opposed side. In the illustrative embodiment, because holes are predrilled in riser 38 so fasteners can secure floor plank 74 thereto, a row of multiple floor planks 74 will be positioned the same distance, illustratively indicated by distance 110 from each other, regardless of their slight difference in sizes. The different sizes of the floor planks will be accounted for by the use of tongues 76 and grooves 78. As shown herein, tongue 76 of floor plank 74 is inserted into groove 78' of floor plank 74". Likewise, groove 78 of floor plank 74 receives tongue 76" of floor plank 74". It is not known to what extent floor plank 74 is wider or narrower than either floor planks 74' or 74". Because floor plank's 74, 74', and 74", are all positioned an equal distance from each other, it will be the extent to which the tongues will be inserted into adjacent grooves that will account for at least a portion of the variance in size. In this example, tongue 76 is inserted into the groove 78' to produce a narrower gap 112 when floor plank 74 is engaged with floor plank 74' than the wider gap 114, shown created in groove 78 when tongue 76" of floor plank 74" is inserted into the groove 78 of floor plank 74. In this way, a substantially continuous floor structure of flooring assembly 34 is created with only minor gaps such as gap 118 and gap 120 being created. It will be appreciated by the skilled artisan upon reading this disclosure, however, that those gaps at the top of flooring assembly 34 are de minimis and do not detract from the aesthetics or utility of flooring assembly 34. Indeed, gaps such as 118 and 120 may serve to provide additional tread features to floor assembly 34.

Further shown in FIG. 8 are embodiments of base sections 90 and 90' of floor planks 74 and 74', respectively. Each of the floor planks include such base section 90 to support the floor plank and provide an attachment area to receive fasteners 88 (see, also, FIGS. 4 and 7) such as bolts. In further embodiments, floor plank 74 may also include a separate leg 122 with foot 124 in order to engage risers 36 and 38. For purposes of providing additional structural support for each floor plank 74, it is further appreciated that end plank 86 may include such base section 136, leg 138, and foot 140 (see FIG. 7).

Figure 9:
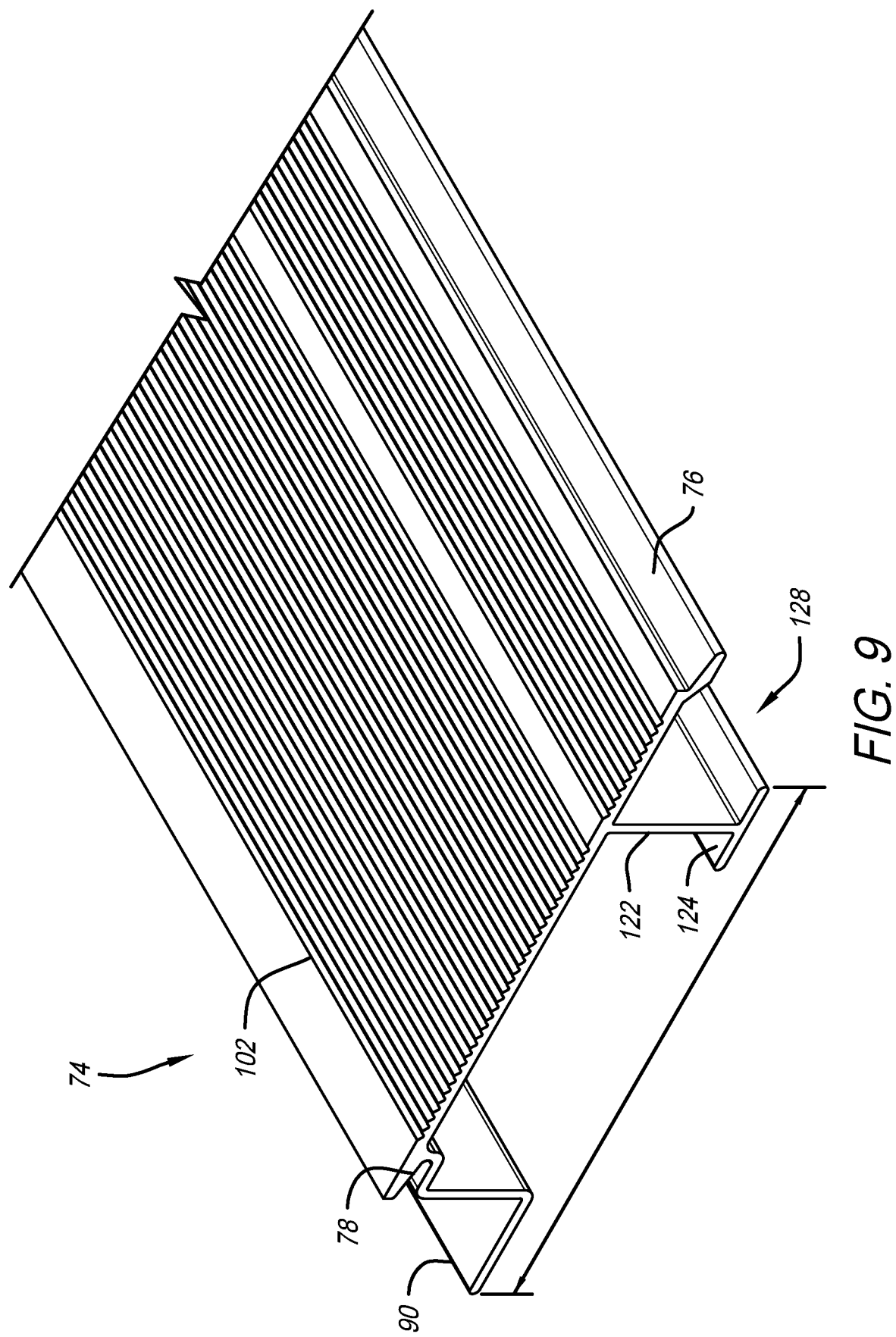
FIG. 9 is a perspective view of the floor plank.

A perspective view of a portion of floor plank 74 is shown in FIG. 9. This view shows the longitudinally extending floor plank 74 having a width 126 and including tongue 76 running longitudinally along the length of floor plank 74 on one side and groove 78 at the other side. Base section 90 also extends from the width of floor plank 74, but is located underneath top tread section 102, and specifically adjacent floor plank 74. Leg 122 and foot 124 are illustratively recessed from tongue 176 at 128 so base section 90 of an adjacent floor plank 74 may be positioned next to foot 124. It is appreciated that base section 90 and foot 124 are so positioned to accommodate adjacent floor planks.

Figure 10:
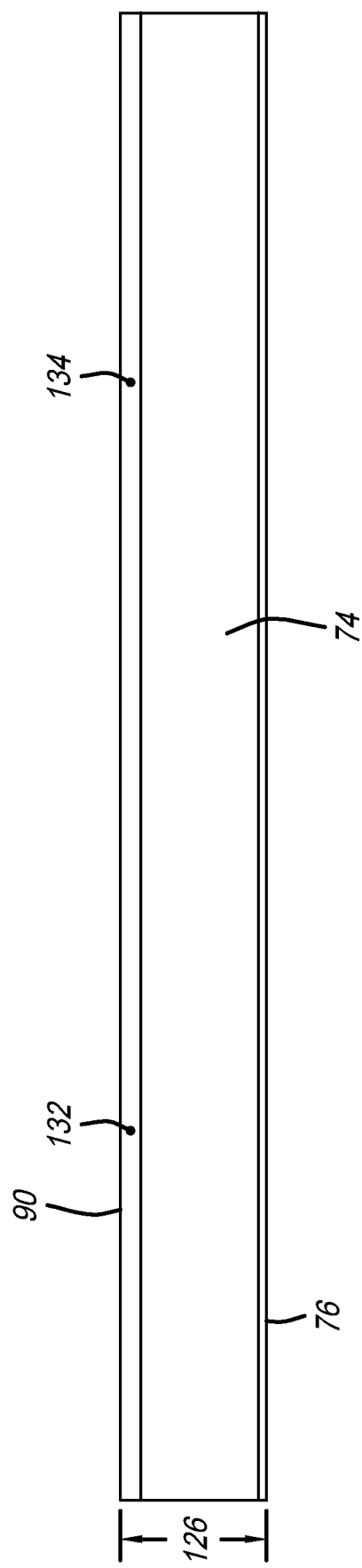
FIG. 10 is a top view of the floor plank.

A top view of floor plank 74 shown in FIG. 10 depicts base section 90 with holes 132 and 134 disposed therethrough for fastening to risers 36 and 38. Despite width 126 possibly of floor plank 74 being slightly variable, holes 132 and 134 ensure each floor plank 74 is located at predetermined positions along risers 36 and 38 and securing thereto via fasteners 88. Widths of tongue 76 and groove 78 (see FIG. 9) are sized so they will engage corresponding grooves and tongues of adjacent floor planks sufficient to account for that variance in size.

Figure 11:
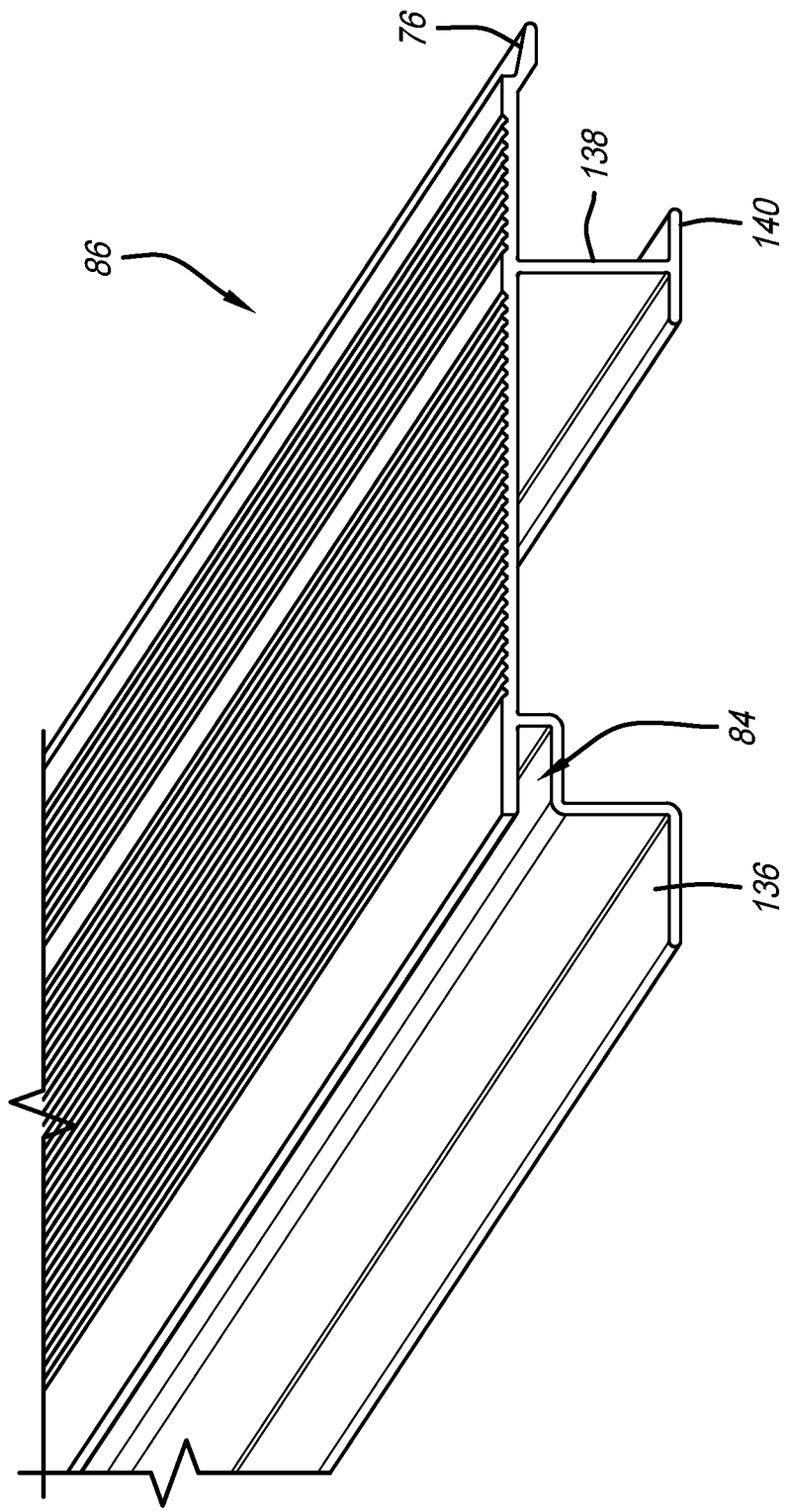
FIG. 11 is a perspective view of an end plank.
Figure 12:
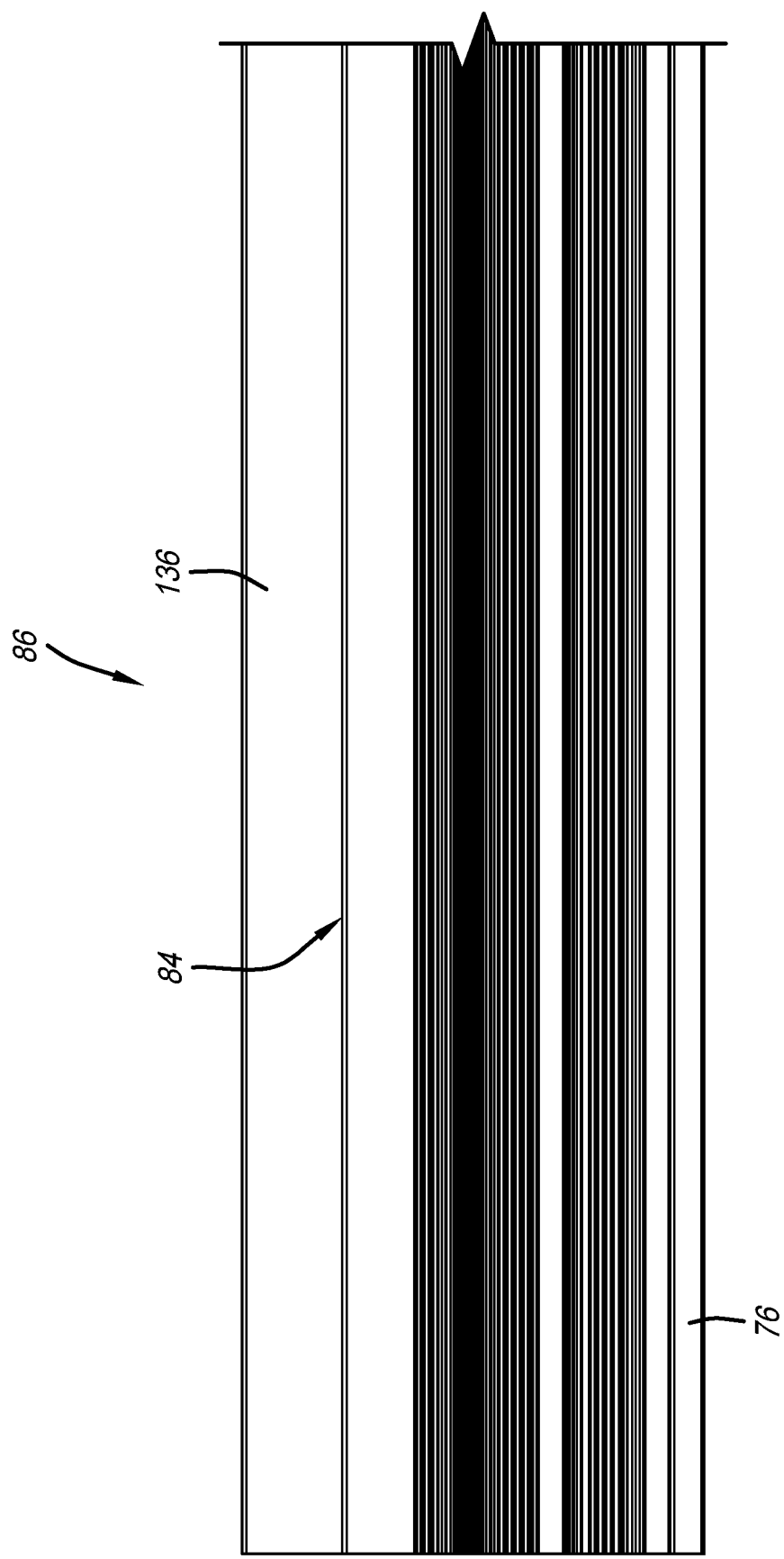
FIG. 12 is a top view of the end plank.

Perspective and top views of end plank 86 are shown in FIGS. 11 and 12. The views depict longitudinally extending tongue 76 extending from a first width end of end plank 86. Longitudinally extending channel 84 extends outwardly from the second width end of end plank 86. Base section 136, leg 138, and foot 140 are also shown longitudinally extending along end plank 36 in FIG. 11, particularly. A side cross-sectional detail view of rearward 42 and of cargo compartment 6 is shown in FIG. 13. This view shows top tread section 102 of threshold plank 80. In this illustrative embodiment, threshold plank 80 may also include lower support section 104 fastened to rear section 14 and riser 38 via fasteners 103 and 105, for example. Lower support section 104 includes a tongue bar portion 106 that can be mated with tongue bar portion 108 of top tread section 102. Both tongue bar portions 106 and 108 are configured to fit into channel 84 of end plank 86 (see, also, FIG. 7). It is appreciated, however, that in other embodiments, the threshold plank 80 may be made of a single component such as a single extruded plank while still having a tongue bar fitting into channel 84 and securing to rear section 14. Still, alternatively, threshold plank 80 may be made of multiple components, possibly three or more components, that can be assembled together to form the final threshold plank. Again, the multi-component version will still have a tongue bar that inserts into channel 84 and be attachable to rear section 14.

As part of automating the parcel delivery process, automated functions may add value by saving time. Another illustrative embodiment of the present disclosure includes an automatic sliding door system. The system can be used on a variety of delivery/cargo vehicle doors, including the bulkhead door that separates the driver and cargo compartments, as well as a sliding exterior door to enter and exit the vehicle. For example, to save time when a delivery vehicle makes a stop on its route, using a pushbutton controller, key fob, wristband, or other like activation device can activate a motor that moves the door to an open position. Conversely, such activation systems can be used to activate the motor again to close the door. This may occur when the operator leaves the vehicle so the door will close behind after exiting. It is appreciated that with this system the sliding door will automatically open and close.

Figure 15:
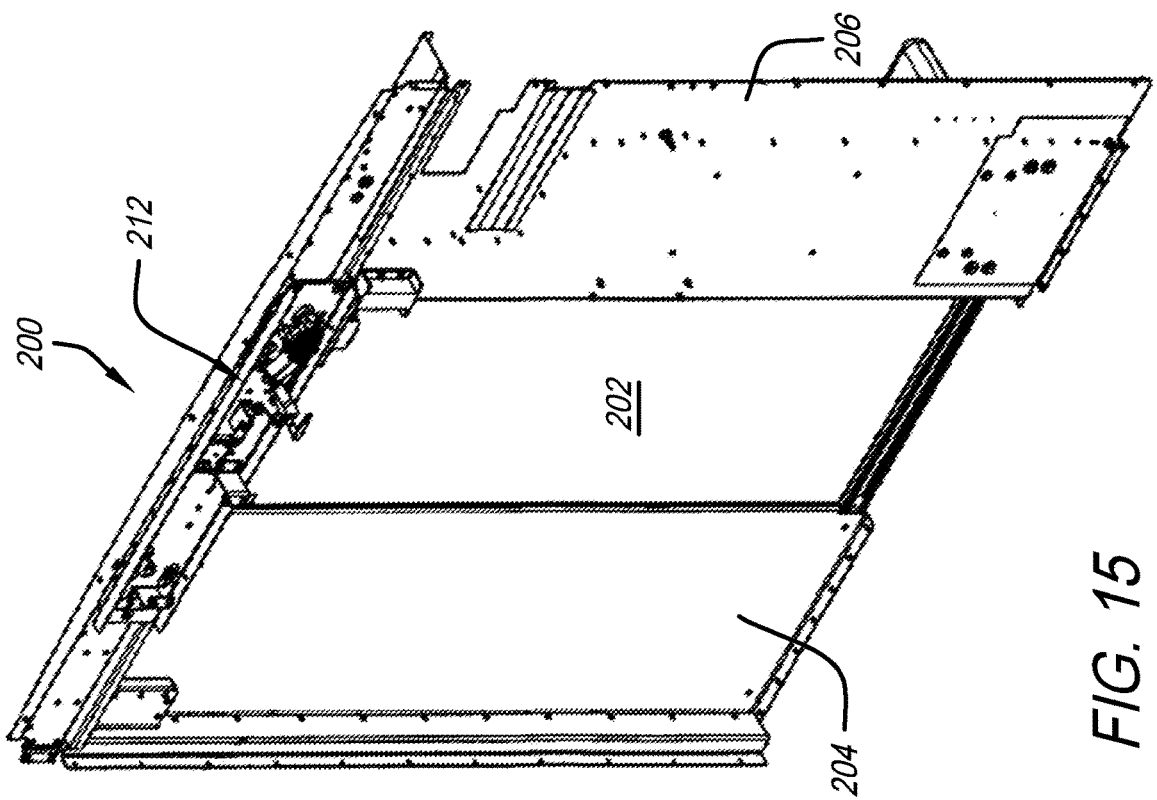
FIG. 15 is another isolated detail view of the bulkhead portion of a delivery vehicle.
Figure 14:
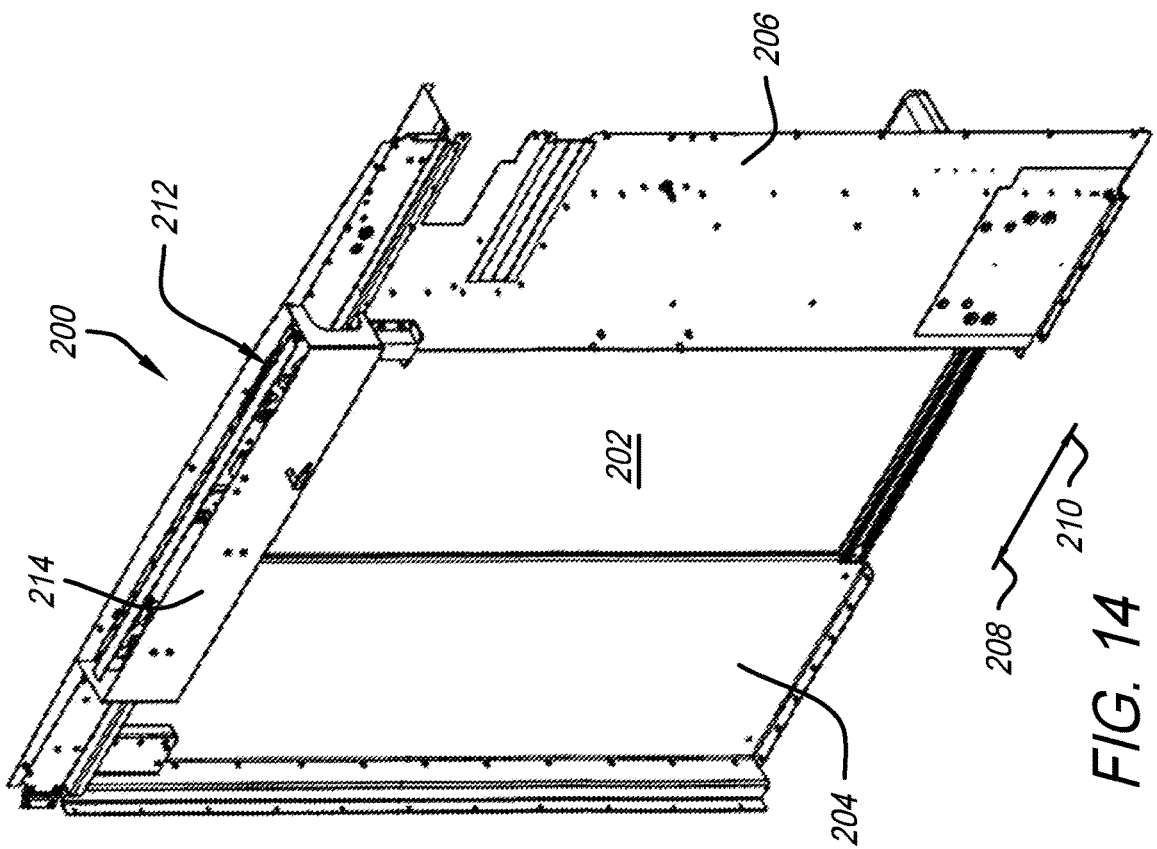
FIG. 14 is an isolated detail view of a bulkhead portion of a delivery vehicle.

Perspective isolated detail views of a bulkhead 200 that can be positioned between the driver compartment 4 and cargo compartment 6 are shown in FIGS. 14 and 15. A sliding door 202 in about the center is bounded by bulkhead panels 204 and 206 as illustratively shown. Sliding door 202 is configured to slide back and forth in directions 208 and 210 between open and closed positions. A motorized door sliding assembly 212 is located above the door as shown in FIGS. 14 and 15 as well. The distinction between FIGS. 14 and 15 is that a cover panel 214 is located over motorized door sliding assembly 212 in FIG. 14 and is removed in FIG. 15. Motorized door slide assembly 212 is configured to slide door 202 automatically when it receives a signal to do so.

Figure 16:
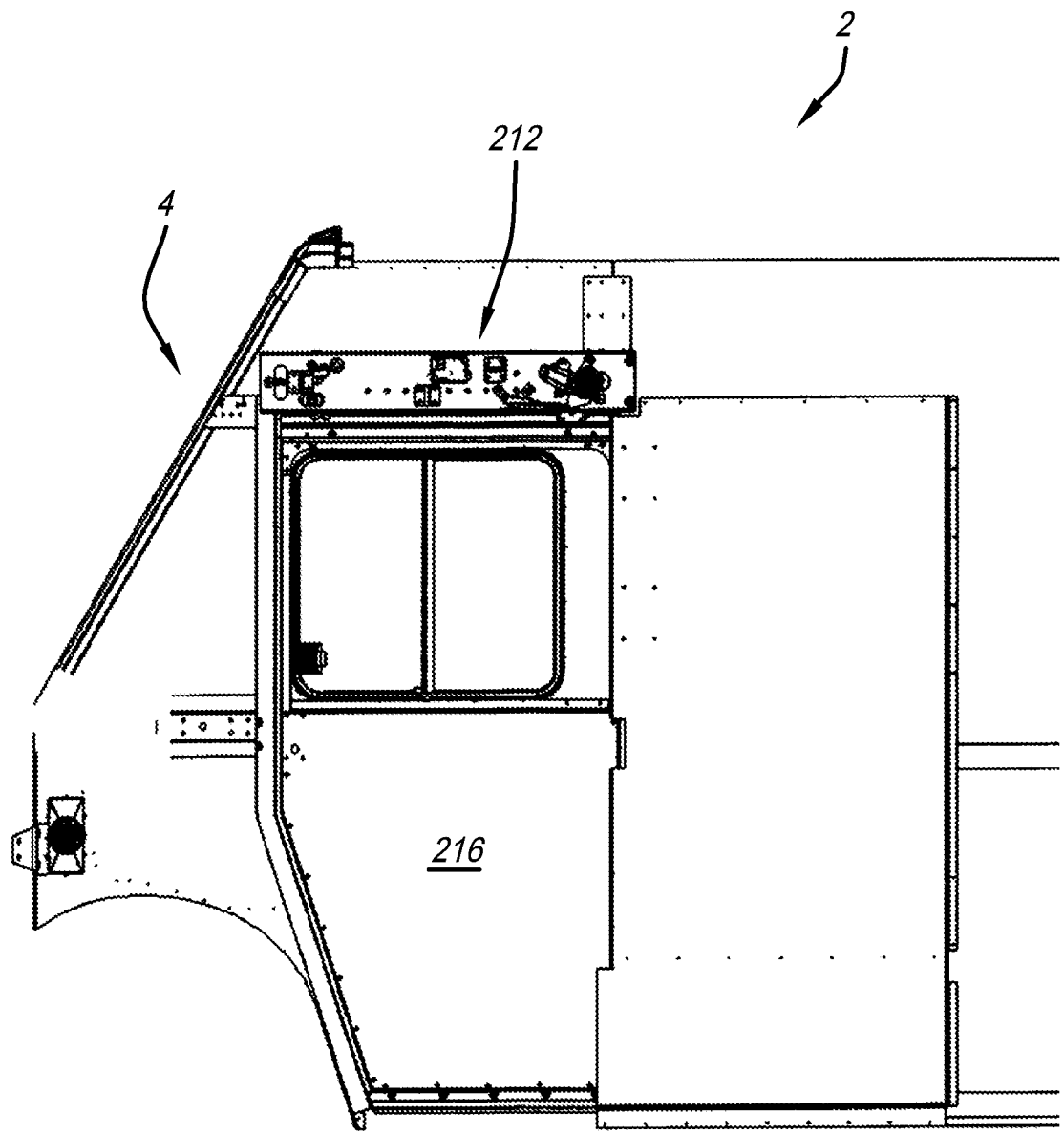
FIG. 16 is a side isolated detail view of a portion of the passenger side of a driver compartment of the delivery vehicle with the slide door closed.
Figure 17:
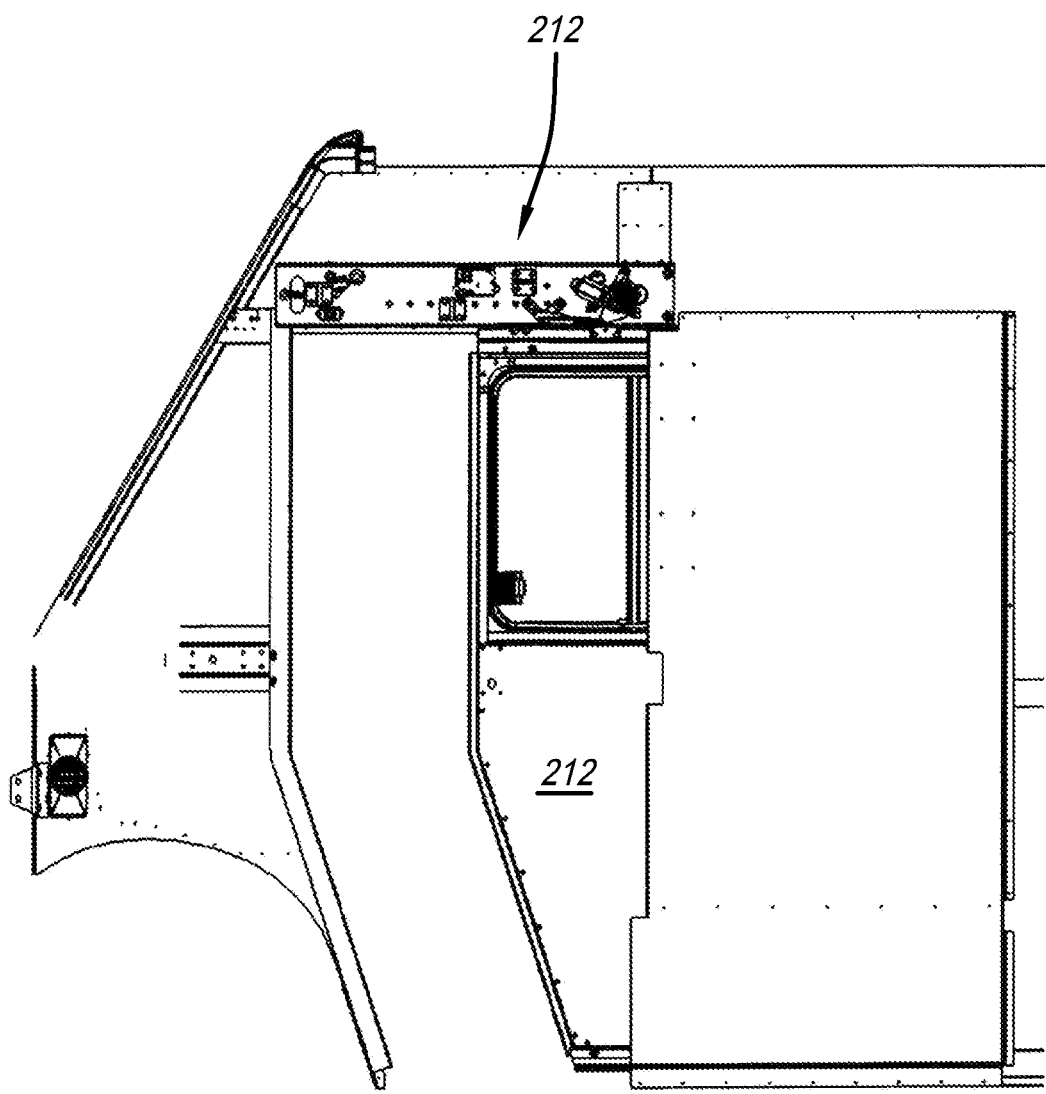
FIG. 17 is another side isolated detail view of a portion of the driver compartment of the delivery vehicle with the slide door partially open.
Figure 18:
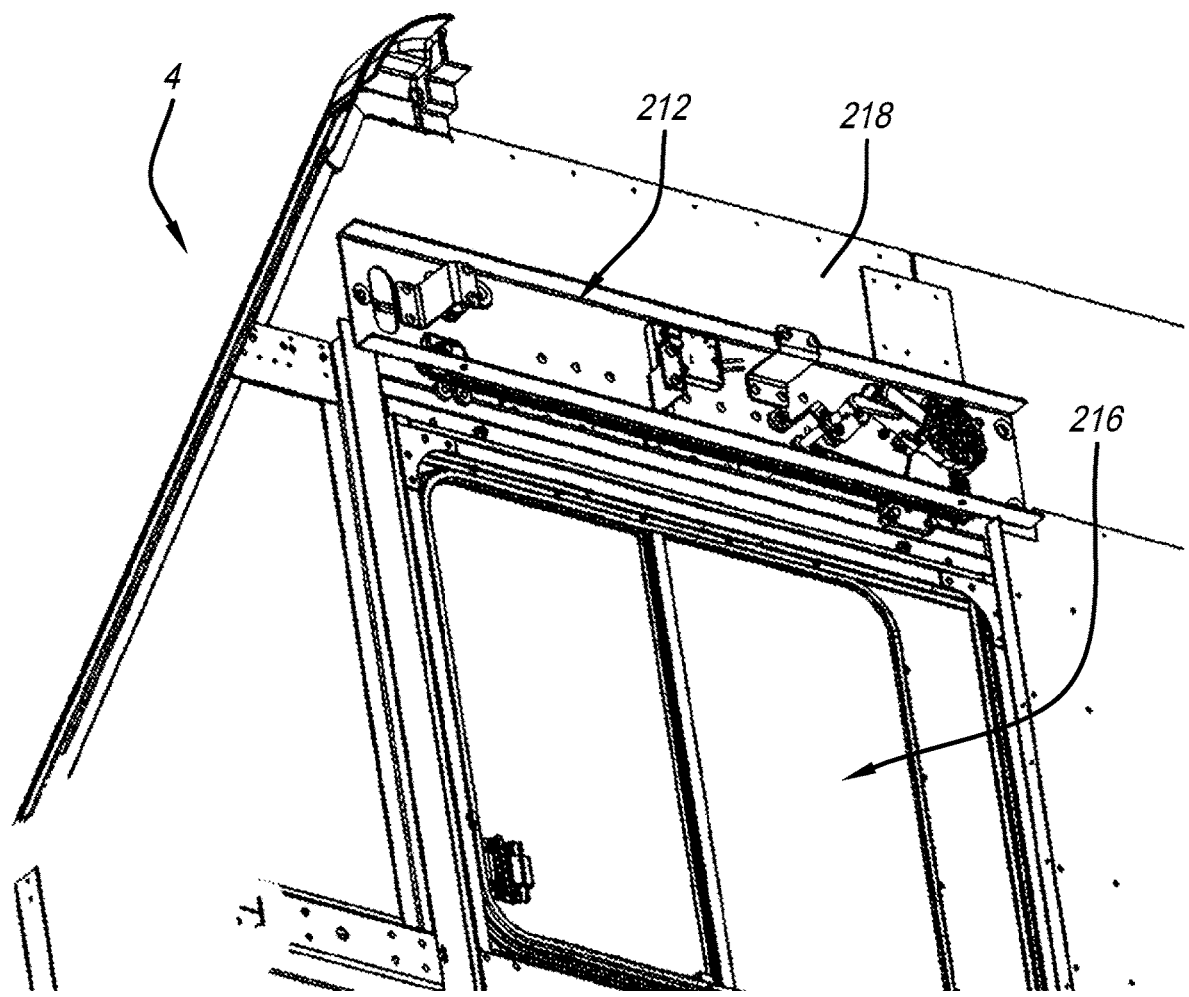
FIG. 18 is an isolated detail view of a portion of the driver compartment of the delivery vehicle showing a motorized door sliding assembly.

Side and perspective isolated detail views of a portion of the passenger side of driver compartment 4 are shown in FIGS. 16, 17, and 18. The view of FIG. 16 depicts a slide door 216 located in its closed position. Conversely, in FIG. 17, slide door 216 is shown partially open. A motorized door sliding assembly 212 like that used on sliding door 202 at bulkhead 200 is located above the sliding door 216 to move same between open and closed positions when activated.

A perspective view of a portion of driver compartment 4 is shown in FIG. 18. This view further shows motorized door sliding assembly 212 located above slide door 216 to automatically move same between open and closed positions. Motorized slide door assembly may be attached to the sidewall 218 of driver compartment 4 in order to open and close slide door 216.

Figure 19:
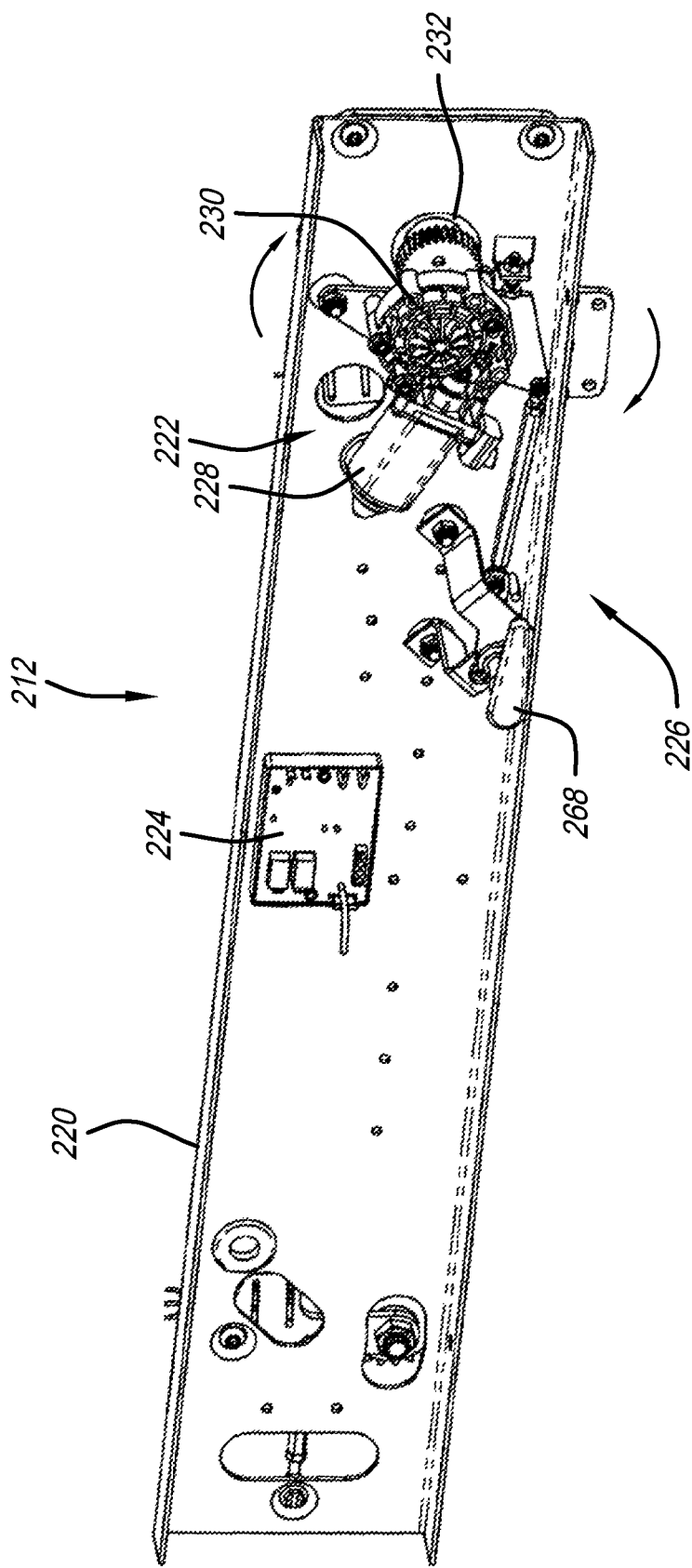
FIG. 19 is a perspective front side view of the motorized sliding door assembly mechanism.
Figure 20:
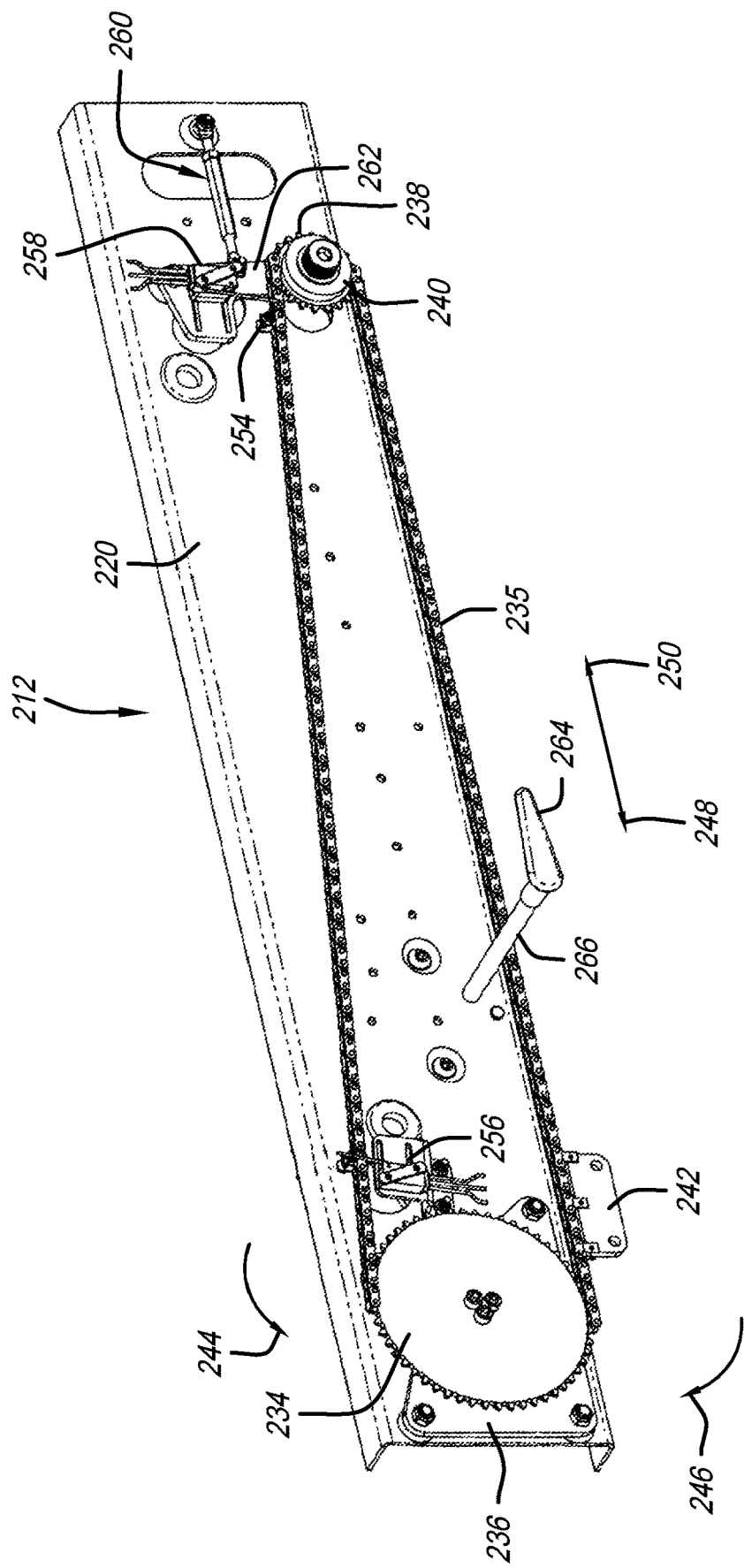
FIG. 20 is a perspective backside view of the motorized sliding door assembly mechanism.

Regardless of whether motorized door sliding assembly 212 is used with sliding door 202 at bulkhead 200 between driver compartment 4 and cargo compartment 6, or slide door 216 used for ingress or egress of driver compartment 4, motorized door sliding assembly 212 may be similarly configured. Front side and rear side perspective views of the motorized door sliding assembly 212 is shown in FIGS. 19 and 20. The view in FIG. 19 depicts the front side of motorized door sliding assembly 212 which includes a U-shaped bracket 220 that supports a motor assembly 222 and controller 224. When activated by a pushbutton, wristband, RFID proximity source, etc., controller 224 activates motor assembly 222 in order to move a sliding door (such as sliding door 202 or slide door 216, for example). Also shown on this side of U-shaped bracket 220 is manual release mechanism 226 that disengages motor assembly 222 in order to manually slide the attached door.

More particularly, when controller 224 receives a signal it activates motor assembly 222 which includes a motor 228 which rotates and drive a gearbox 230. Gears within gearbox 230 rotate to drive gear 232 which is rotatably coupled to a drive sprocket 234 illustratively located on the opposing side of U-shaped bracket 220 as shown in FIG. 20. Motorized door sliding assembly 212 includes a drive chain 235 disposed about teeth 236 and 238 of sprocket 234 and idler sprocket 240, respectively. A portion of drive chain 235 has been removed only for demonstrable purposes to show the teeth of drive sprocket 234 and idler sprocket 240. A door bracket 242 is fixed onto drive chain 235 and attached to a sliding door such as sliding door 202 or slide door 216 (see, also FIGS. 14 and 16).

When motor assembly 222 rotates drive gear 232 which rotates drive sprocket 234 in direction 244, thereby rotating drive chain 235, door bracket 242 moves in direction 250 toward an open position. Conversely, when motor assembly 222 rotates drive gear 232 in the opposite direction 246, door bracket 242 illustratively moves in direction 248 towards a closed position. It is appreciated by the skilled artisan that motorized door sliding assembly 212 may be so configured such that opening the door is a result of moving door bracket 242 in direction 250 and closing the door is from movement in direction 248.

Position sensor tag 254 is attached to drive chain 235 at a position such that when the door is open or closed, position sensor tag 254 will be in proximity to either position switches 256 and 258, respectively. When one of the switches is in proximity of a sensor, a signal is sent to controller 224 to indicate the door is either open or closed.

In order to ensure idler sprocket 240 maintains the appropriate amount of tension on drive chain 235 with respect to drive sprocket 234, and idler adjustment linkage 260 is attached to U-shaped panel 220 and sprocket bracket 262. Idler adjustment linkage 260 calls on sprocket bracket 262 in order to maintain sufficient tension on drive chain 235. Adjustment of idler adjustment linkage 260 may be made periodically to pull or relieve sprocket bracket 262 for adjusting the tension of drive chain 235.

Also shown in FIG. 20 is manual release handle 264 configured to rotate manual release bar 266 which extends through U-shaped panel 220 and manual release handle 268 on the other side, as shown in FIG. 19. As such manual release mechanism 226 can be activated from either side of U-shaped panel 220 (as further described with respect to FIGS. 24A, 24B, and 24C).

Frontside and backside views of motorized door sliding assembly 212 depicting the relative movement of door bracket 242 between open and closed positions are shown in FIGS. 21A, 21B, 22A, 22B, and 23A and 23B, respectively. The front view of motorized door sliding assembly 212 shown in FIG. 21A depicts door bracket 242 illustratively located opposite motor assembly 222. When looking at the back view of motorized door sliding assembly 212 in FIG. 21B, the sliding door is at a fully open position as indicated by door bracket 242 being located on drive chain 235, adjacent idler sprocket 240, the same position as that shown in FIG. 21A. It is also notable in FIG. 21B that position sensor 252 is in proximity of position switch 256. In this arrangement, a signal is sent to controller 224 to indicate that the door is in its open position.

When controller 224 receives a signal to begin opening an attached slide door, it sends a signal to motor assembly 222, which begins rotating drive gear 232 as shown in FIG. 22A. When this happens, drive sprocket 234 is rotated illustratively in direction 246, as shown in FIG. 22B, which likewise moves drive chain 235 in direction 248 in order to move door bracket 242 (and, thus, a door) in direction 248 as well. With idler sprocket 240 keeping drive chain 235 taught, door bracket 242 will continue to move in direction 248. This view also shows position sensor 252 outside the proximity of position switch 256 indicating that the door attached to door bracket 242 is no longer in a fully open position.

Figure 23A:
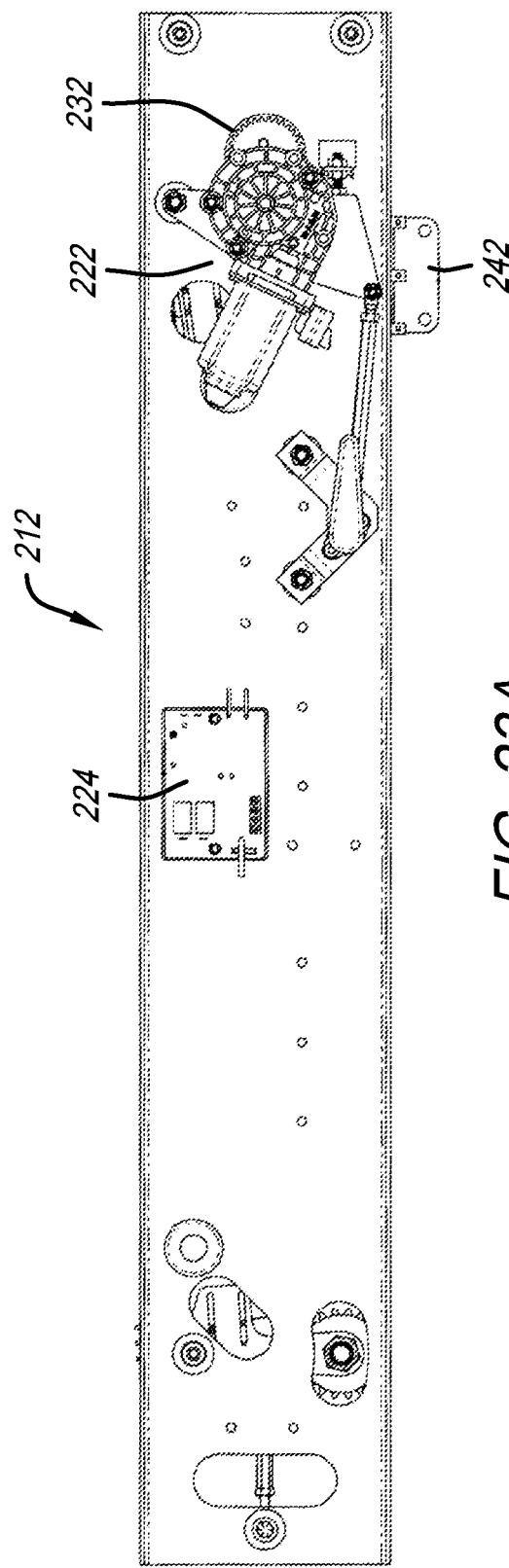
FIGS. 23A and 23B are front and back views of the motorized sliding door assembly mechanism with the door bracket located in an illustrative closed position.
Figure 23B:
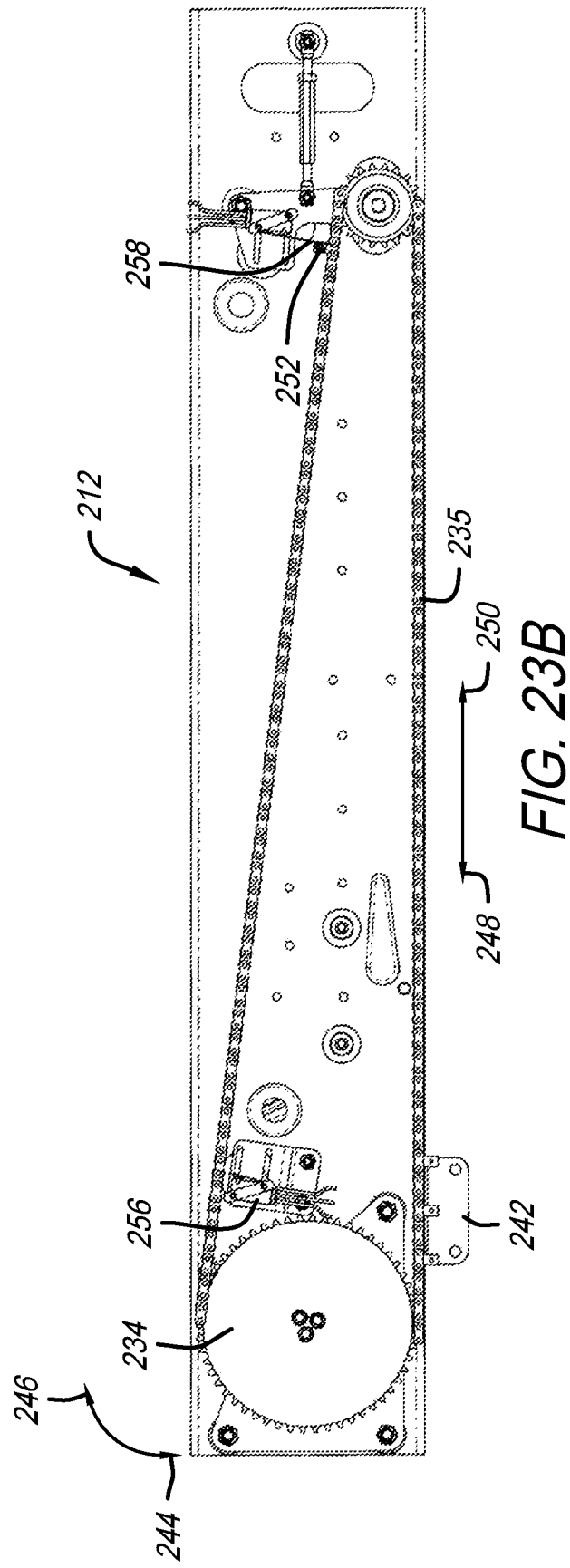

If travel continues in direction 248 by virtue of sprocket 234 continuing to rotate in direction 246, door bracket 242 likewise continues moving in direction 248 until it has reached a closed position as shown in FIGS. 23A and 23B. Note in these views, door bracket 242 is positioned opposite that shown in FIGS. 21A and 21B. Also note as shown in FIG. 23B, position sensor 252 on drive chain 235 is located adjacent closed position switch 258. At this location a signal is sent to controller 224 to indicate that the door is now closed. To open the door again, the processes are reversed. A signal is sent to controller 224 to activate motor assembly 222 in order to rotate drive gear 232 in the opposite direction 244. Drive gear 232 now rotates drive sprocket 234 in direction 244 which will move door bracket 242 now in opposite direction 250 back to the open position. This will continue happening until position sensor 252 on drive chain 235 approaches proximity of position sensor 256 which sends a signal to controller 224 indicating door bracket 242 is located in the open position.

Figure 24C:
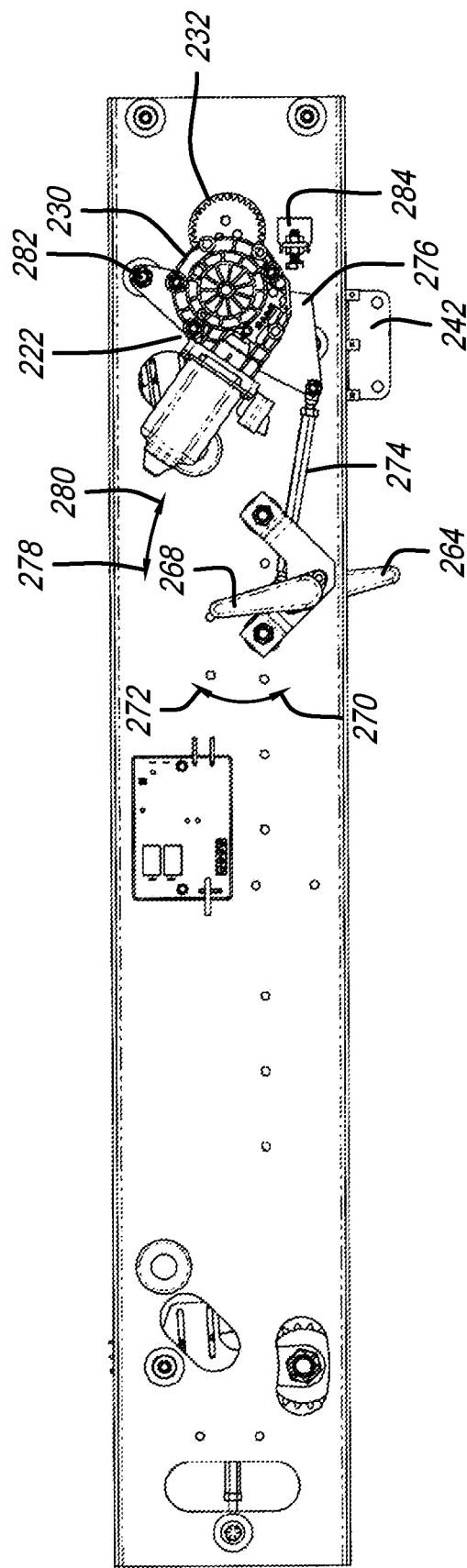

Another feature of motorized door sliding assembly 212 is manual release mechanism 226. If, for some reason, motor assembly 222 fails to actuate, it can be manually disengaged from drive gear 232, allowing drive sprocket 234 and idler sprocket 240 to rotate freely under manual force on door bracket 242. As shown in FIGS. 24A, 24B, and 24C, manual release mechanism 226 includes manual release handle 268 which is pivotable on manual release bar 266 (see, also, FIG. 20). By rotating manual release handle 268 in direction 270, manual release bar 266 pulls on link 274 which is also attached to motor assembly bracket 276, as shown in FIG. 24A. This action moves link 274 in direction 278. Illustratively, motor assembly bracket 276 may be pivotably attached to U-shaped bracket 220 via fastening pin 282. Upon this movement of motor assembly bracket 276, attached gearbox 230 is likewise moved as shown in FIG.

24B. It is appreciated that either manual release handles 264 or 268 may be rotated in order to pull motor assembly bracket 276 in direction 278 to release gearbox 230 from drive gear 232.

As shown in FIG. 24C, further rotation of manual release handle 264 or 268 in direction 270 pulls link 274 and, thus, moves motor assembly bracket 276 far enough to cause gearbox 230 from releasing from drive gear 232. This will allow drive sprocket 234 to be able to rotate freely. Under this condition, door bracket 242 can move in either direction 248 or 250 (see FIGS. 21B, 22B, and 23B) under manual force. It is appreciated that either or both link 274 or motor assembly bracket 276 may be spring-loaded, or otherwise biased to cause motor assembly bracket 276 to be biased or automatically move in direction 280 when that bias is not overcome by rotating either manual release handles 264 or 268 in direction 270. This bias automatically causes gearbox 230 to remain engaged with drive gear 232 unless that bias is overcome by operation of manual release mechanism 226. Additionally, an illustrative stop 284 may be positioned with respect to motor assembly bracket 276 in order to limit movement of same back in direction 280 when gearbox 230 is to engage drive gear 232 again. This assists in preventing any impact damage between the teeth of gearbox 230 and drive gear 232.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. A delivery vehicle comprising:
    a driver compartment;
    a cargo compartment located adjacent the driver compartment;
    at least one riser extending along at least a portion of the cargo compartment;
    wherein the at least one riser includes a plurality of holes disposed therein;
    wherein each of the plurality of holes disposed in the at least one riser are spaced apart from each other a predetermined distance; and
    a flooring assembly located in the cargo compartment and supported by the at least one riser;
    wherein the flooring assembly includes:
        at least a plurality of floor planks;
        wherein each floor plank of the at least the plurality of floor planks has a longitudinal extent, a width transverse to the longitudinal extent, a longitudinally extending tongue located at a first end of the width, and a longitudinally extending groove located at a second end of the width opposite the first end of the width;
        wherein at least one floor plank of the at least the plurality of floor planks has a width greater than a width of another floor plank of the at least the plurality of floor planks;
        wherein the each floor plank of the at least the plurality of floor planks is positioned such that the tongue located at the first end of the width of the each floor plank of the at least the plurality of floor planks is positioned in the longitudinally extending groove of an adjacent floor plank of the at least the plurality of floor planks;
        wherein a distance the tongue of a first floor plank of the at least the plurality of floor planks extends into the longitudinally extending groove of its adjacent floor plank of the at least the plurality of floor planks is not identical to a distance the tongue of a second floor plank of the at least the plurality of floor planks extends into the longitudinally extending groove of its adjacent floor plank of the at least the plurality of floor planks;
        wherein the each floor plank of the at least the plurality of floor planks is fastened to one of the plurality of holes disposed in the at least one riser;
        an end plank that includes a longitudinal extent, a width transverse to the longitudinal extent, a longitudinally extending tongue located at a first end of the width of the end plank, and a longitudinally extending channel located at a second end of the width of the end plank opposite the first end of the width of the end plank;
        wherein the longitudinally extending tongue of the end plank extends into the longitudinally extending groove of its adjacent floor plank of the at least the plurality of floor planks; and
        a threshold plank coupled to a rear section of the cargo compartment;
        wherein the threshold plank has a longitudinal extent, a width transverse to the longitudinal extent of the threshold plank, and a longitudinally extending tongue bar located at a first end of the width of the threshold plank; and
        wherein the longitudinally extending tongue bar of the threshold plank extends into the longitudinally extending channel of the end plank.

2. The delivery vehicle of claim 1, wherein the longitudinally extending tongue bar of the threshold plank is wider than the longitudinally extending tongue of the each floor plank of the at least the plurality of floor planks.

3. The delivery vehicle of claim 1, wherein the end plank located adjacent the threshold plank has a deeper longitudinally extending channel than the longitudinally extending groove of the each floor plank of the at least the plurality of floor planks.

4. The delivery vehicle of claim 1, wherein the each of the plurality of holes disposed in the at least one riser spaced apart from each other the predetermined distance is equidistant between the each of the plurality of holes.

5. The delivery vehicle of claim 1, wherein a depth to which the longitudinally extending tongue bar of the threshold plank extends into the longitudinally extending channel of the end plank is dependent on the width of the end plank.

6. The delivery vehicle of claim 1, wherein the each floor plank of the at least the plurality of floor planks includes a base with at least one hole disposed therethrough.

7. The delivery vehicle of claim 6, wherein the at least one hole disposed through the base aligns with the one of the plurality of holes disposed in the at least one riser.

8. The delivery vehicle of claim 7, wherein the at least one hole in the base and the at least one hole in the at least one riser receives a fastener to secure the floor plank of the plurality of floor planks to the at least one riser.

9. The delivery vehicle of claim 1, wherein the each floor plank of the at least the plurality of floor planks includes a foot member that supports the floor plank on the at least one riser.

10. The delivery vehicle of claim 1, wherein the tongue bar of the threshold panel comprises a first panel and a second panel both located adjacent the end plank.

11. The delivery vehicle of claim 1, wherein the end plank is fastened to the at least one riser.

12. A delivery vehicle comprising:
a driver compartment;
a cargo compartment located adjacent the driver compartment;
at least one riser extending along at least a portion of the cargo compartment;
wherein the at least one riser includes a plurality of holes disposed therein;
wherein each of the plurality of holes disposed in the at least one riser are spaced apart from each other a predetermined distance; and
a flooring assembly located in the cargo compartment and supported by the at least one riser;
wherein the flooring assembly includes:
at least a plurality of floor planks;
wherein each floor plank of the at least the plurality of floor planks has a longitudinal extent, a width transverse to the longitudinal extent, a longitudinally extending tongue located at a first end of the width, and a longitudinally extending groove located at a second end of the width opposite the first end of the width;
wherein the each floor plank of the at least the plurality of floor planks is fastened to one of the plurality of holes disposed in the at least one riser;
wherein the each floor plank of the at least the plurality of floor planks is positioned such that the tongue located at the first end of the width of the each floor plank is positioned in the longitudinally extending groove of an adjacent floor plank of the at least the plurality of floor planks; and
wherein at least one floor plank of the at least the plurality of floor planks has a width greater than a width of another floor plank of the at least the plurality of floor planks.

13. The delivery vehicle of claim 12, wherein a distance the tongue of a first floor plank of the at least the plurality of floor planks extends into the longitudinally extending groove of its adjacent floor plank of the at least the plurality of floor planks is not identical to a distance the tongue of a second floor plank of the at least the plurality of floor planks extends into the longitudinally extending groove of its adjacent floor plank of the at least the plurality of floor planks.

14. The delivery vehicle of claim 12, wherein an end plank that includes a longitudinal extent, a width transverse to the longitudinal extent, a longitudinally extending tongue located at a first end of the width of the end plank, and a longitudinally extending channel located at a second end of the width of the end plank opposite the first end of the width of the end plank, wherein the longitudinally extending channel has a depth greater than a depth of the longitudinally extending groove of the each floor plank of the plurality of floor planks.

15. The delivery vehicle of claim 14, wherein the longitudinally extending tongue of the end plank extends into the longitudinally extending groove of its adjacent floor plank of the at least the plurality of floor planks.

16. The delivery vehicle of claim 14, further comprising a threshold plank coupled to a rear section of the cargo compartment.

17. The delivery vehicle of claim 16, wherein the threshold plank has a longitudinal extent, a width transverse to the longitudinal extent of the threshold plank, and a longitudinally extending tongue bar located at a first end of the width of the threshold plank.

18. The delivery vehicle of claim 17, wherein the longitudinally extending tongue bar of the threshold plank extends into the longitudinally extending channel of the end plank.

19. A delivery vehicle comprising:
a driver compartment;
a cargo compartment located adjacent the driver compartment; and
a flooring assembly located in the cargo compartment;
wherein the flooring assembly includes:
at least a plurality of floor planks;
wherein each floor plank of the at least the plurality of floor planks has a longitudinal extent, a width transverse to the longitudinal extent, a longitudinally extending tongue located at a first end of the width, and a longitudinally extending groove located at a second end of the width opposite the first end of the width;
wherein at least one floor plank of the at least the plurality of floor planks has a width greater than a width of another floor plank of the at least the plurality of floor planks;
wherein the each floor plank of the at least the plurality of floor planks is positioned such that the tongue located at the first end of the width of the each floor plank is positioned in the longitudinally extending groove of an adjacent floor plank of the at least the plurality of floor planks;
wherein a distance the tongue of a first floor plank of the at least the plurality of floor planks extends into the longitudinally extending groove of its adjacent floor plank of the at least the plurality of floor planks is not identical to a distance the tongue of a second floor plank of the at least the plurality of floor planks extends into the longitudinally extending groove of its adjacent floor plank of the at least the plurality of floor planks;
an end plank that includes a longitudinal extent, a width transverse to the longitudinal extent, a longitudinally extending tongue located at a first end of the width of the end plank, and a longitudinally extending channel located at a second end of the width of the end plank opposite the first end of the width of the end plank;
wherein the longitudinally extending tongue of the end plank extends into the longitudinally extending groove of its adjacent floor plank of the at least the plurality of floor planks; and
a threshold plank coupled to a rear section of the cargo compartment;
wherein the threshold plank has a longitudinal extent, a width transverse to the longitudinal extent of the threshold plank, and a longitudinally extending tongue bar located at a first end of the width of the threshold plank; and
wherein the longitudinally extending tongue bar of the threshold plank extends into the longitudinally extending channel of the end plank.

* * * * *